United States Patent [19]

Beckner et al.

[11] Patent Number: 4,642,630
[45] Date of Patent: Feb. 10, 1987

[54] METHOD AND APPARATUS FOR BUS CONTENTION RESOLUTION

[75] Inventors: Mark W. Beckner, Warrenville; Thomas J. J. Starr, Wheaton, both of Ill.

[73] Assignee: AT&T Bell Laboratories, Murray Hill, N.J.

[21] Appl. No.: 453,929

[22] Filed: Dec. 28, 1982

[51] Int. Cl.$^4$ .................................................. H04Q 1/00
[52] U.S. Cl. ................................. 340/825.5; 370/43; 370/61; 340/825.51
[58] Field of Search .......... 340/825.5, 825.51, 825.12; 370/85, 94, 43, 32, 61, 62, 99; 371/7, 8; 179/17 B, 19; 455/34; 364/200, 900; 178/3

[56] References Cited

U.S. PATENT DOCUMENTS

| | | | |
|---|---|---|---|
| 3,757,301 | 9/1973 | Regan et al. | 340/825.51 X |
| 4,145,735 | 3/1979 | Soga | 340/825.51 |
| 4,225,919 | 9/1980 | Kyu et al. | 364/200 |
| 4,271,467 | 6/1981 | Holtey | 364/200 |
| 4,271,507 | 6/1981 | Gable et al. | 370/94 |
| 4,359,731 | 11/1982 | Beauford et al. | 370/85 X |
| 4,447,873 | 5/1984 | Price et al. | 364/200 |
| 4,472,712 | 9/1984 | Ault et al. | 340/825.5 |
| 4,488,218 | 12/1984 | Grimes | 340/825.5 X |

OTHER PUBLICATIONS

"Local Communications Controller", Intel Corporation catalog, Oct. 1982, pp. 6–456 through 6–465.
B. Galin, "Local Networks: Programmable Chip Serves Multiple Systems", *Electronic Design*, Oct. 14, 1982, pp. 215–220.
R. Beach et al., "System–Level Functions Enhance Controller IC", *Electronics*, Oct. 6, 1982, pp. 95–96.
"4–Bit Magnitude Comparators", Texas Instruments catalog, rev. Oct. 1976, pp. 7-57 through 7-59.
A. S. Tanenbaum, "The Data Link Layer in SNA and X.25", *Computer Networks*, 1981, Prentice-Hall, Inc., pp. 167–172.
IBM Technical Disclosure Bulletin, vol. 24, No. 11B, Apr. 1982, (New York, US), D. F. Bantz: "Continuation Packet Protocol", pp. 5805–5808.
Local Networks for Computer Communications, North–Holland Publishing Company, 1981, F. A. Tobagi et al.: "Efficient Round–Robin and Priority Schemes for Unidirectional Broadcast System", pp. 125–138, see paragraph III.
Bell System Technical Journal, vol. 61, No. 7, Sep. 1982, (New York, US) N. F. Maxemchuk: "A Variation on CSMA/CD that Yields Movable TDM Slots in Integrated Voice/Data Local Networks", pp. 1527–1550, see paragraphs II–IV,X.
EP, A, 0060517, (CSELT) 22 Sep. 1982, see p. 6, line 13–p. 11, line 18.

*Primary Examiner*—Ulysses Weldon
*Attorney, Agent, or Firm*—Ross T. Watland

[57] ABSTRACT

A method and apparatus for bus contention resolution for use in a digital communications system wherein a plurality of communications controllers are connected to a shared bus for transmitting information in frames. A priority field is included in each transmitted frame. The bus is monitored such that any time the bus is conveying a frame, the priority field of that frame is known at each of the communications controllers. A given communications controller makes a determination based on the priority fields of a new frame and a present frame being actively conveyed by the shared bus that the new frame is of higher priority than the present frame. Upon such a determination, the given communications controller transmits the new frame.

In accordance with a second aspect of the method and apparatus, the bus has the characteristic that when any communications controller connected thereto transmits a predetermined logic value, the bus conveys that predetermined logic value regardless of logic values transmitted by other communications controllers. Each communications controller monitors the bus and counts the number of consecutive bits conveyed thereon having the predetermined logic value. Any communications controller that desires access to the bus consecutively transmits the predetermined logic value a number of times such that the predetermined logic value is conveyed a fixed number of times on the bus. The communications controller then transmits a unique bit sequence but terminates transmission when a difference is detected between a bit transmitted by that communications controller and a bit contemporaneously conveyed by the shared bus.

16 Claims, 21 Drawing Figures

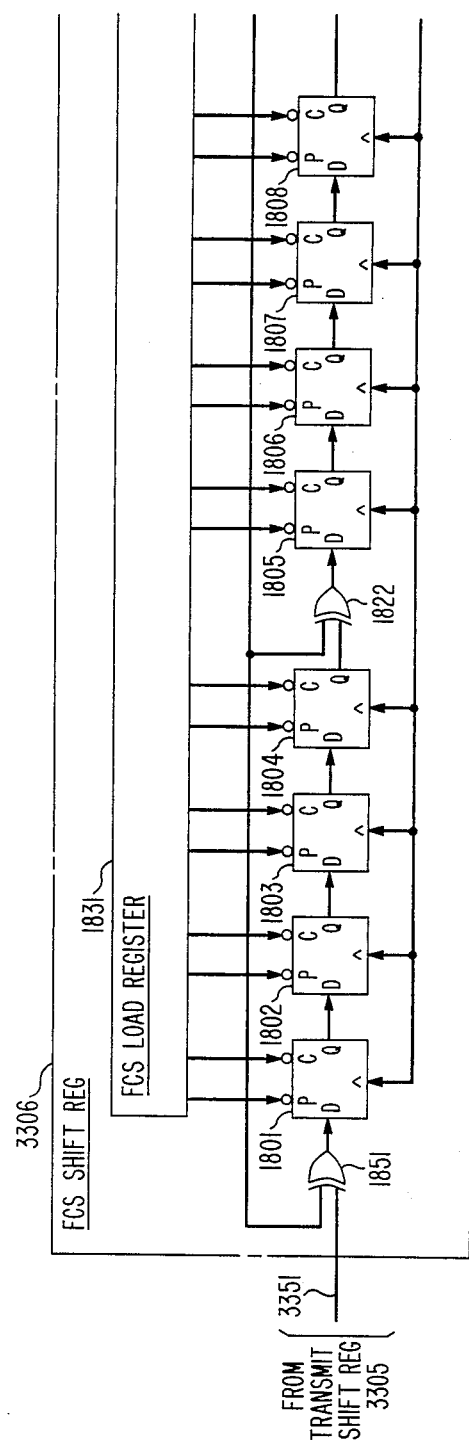

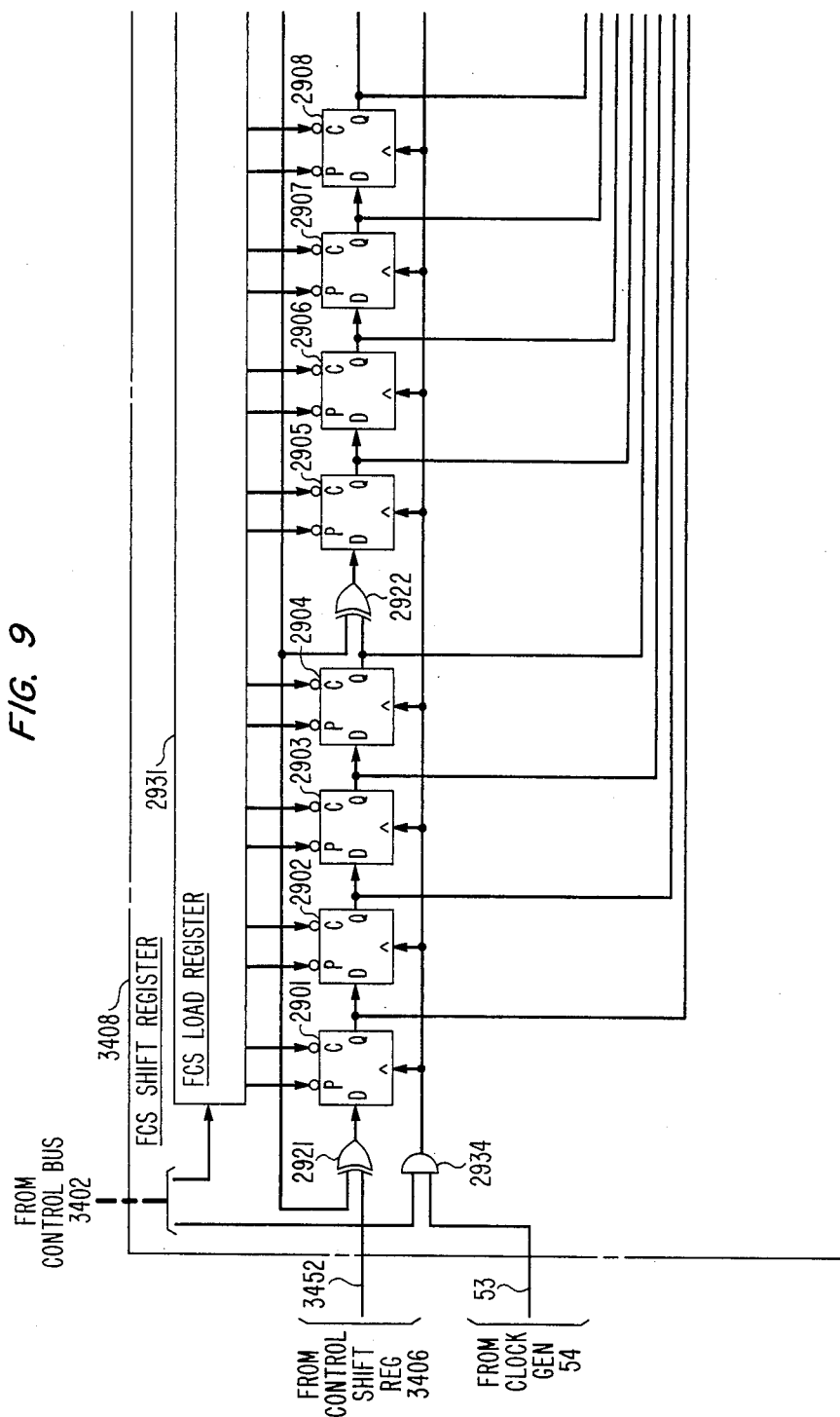

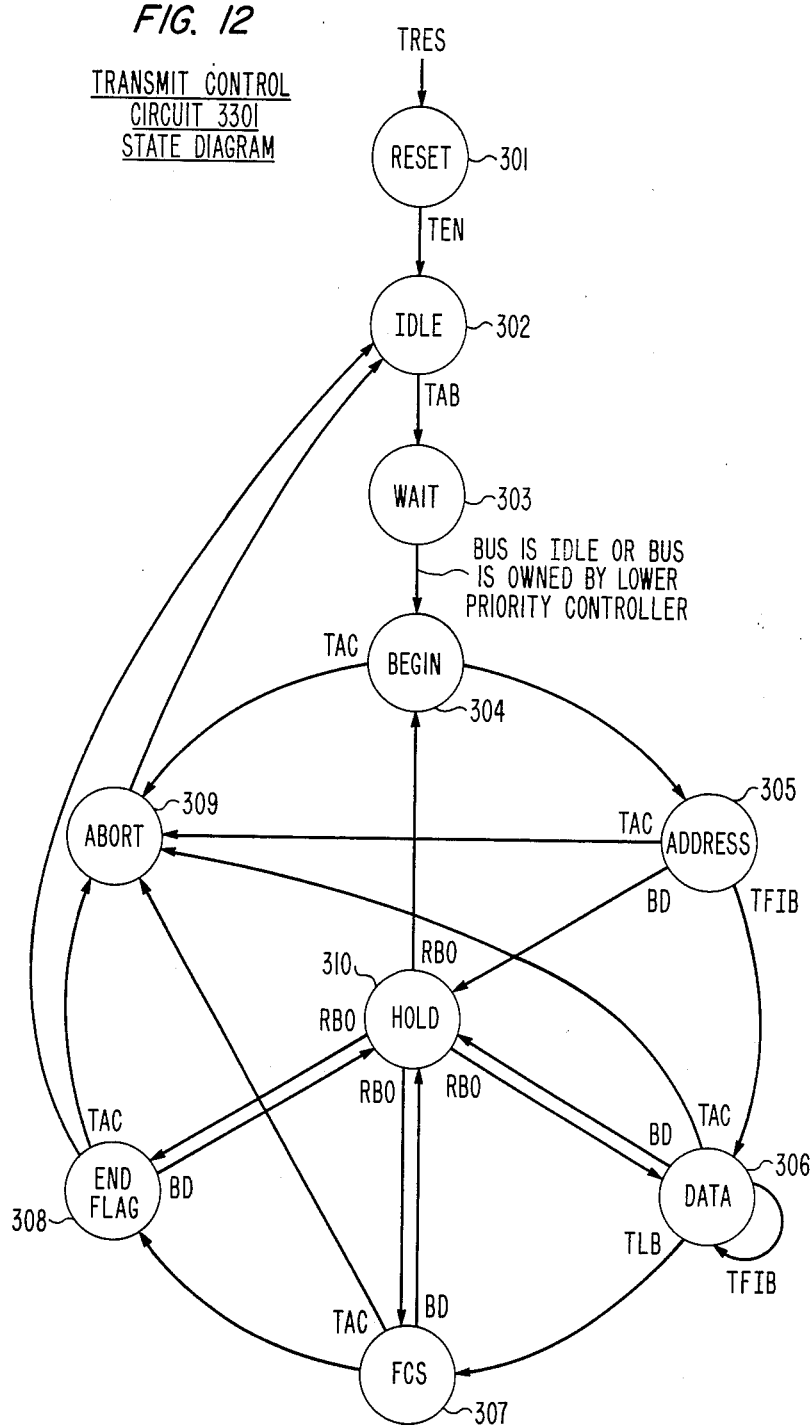

| RSF | | | INDICATION |
|---|---|---|---|
| 0 | 0 | 0 | FLAG SYNCHRONIZATION |
| 0 | 0 | 1 | ADDRESS AVAILABLE |
| 0 | 1 | 0 | DATA AVAILABLE |
| 0 | 1 | 1 | FRAME COMPLETE WITHOUT ERROR |
| 1 | 0 | 0 | ABORT DETECTED |
| 1 | 0 | 1 | IDLE DETECTED |
| 1 | 1 | 0 | GRACEFUL PREEMPTION DETECTED |
| 1 | 1 | 1 | FRAME COMPLETE WITH ERRORS |

RECEIVER STATE FIELD ENCODING

COMMAND REGISTER 3220

REPORT REGISTER 3230

FIG. 21

| TIME | BUS STATE | BUS OWNERSHIP |
|---|---|---|
| t1 | BS=00, IDLE | |
| t2 | BS=11, UNKNOWN | |
| t3 | BS=10, KNOWN | BO=00011100 COMMUNICATIONS CONTROLLER 3000-1 |
| t4 | BS=11, UNKNOWN | |
| t5 | BS=10, KNOWN | BO=00111101 COMMUNICATIONS CONTROLLER 3000-3 |
| t6 | BS=10, KNOWN | BO=00011100 COMMUNICATIONS CONTROLLER 3000-1 |
| t7 | BS=11, UNKNOWN | |
| t8 | BS=10, KNOWN | BO=00101111 COMMUNICATIONS CONTROLLER 3000-2 |
| t9 | BS=10, KNOWN | BO=00011100 COMMUNICATIONS CONTROLLER 3000-1 |
| t10 | BS=00, IDLE | |

METHOD AND APPARATUS FOR BUS CONTENTION RESOLUTION

CROSS-REFERENCE TO RELATED APPLICATION

This application is related to the application of M. W. Beckner and T. J. J. Starr, Ser. No. 454,172, now U.S. Pat. No. 4,542,380 entitled, "Method and Apparatus for Graceful Preemption on a Digital Communications Link", which was filed concurrently herewith on Dec. 28, 1982 and assigned to the assignee of the present invention.

1. Technical Field

This invention relates to digital communications systems and, more particularly, to such systems wherein a number of transmitters must contend for access to a shared bus.

2. Background of the Invention

The rapid advances which have been made in semiconductor technology have permitted an increased reliance on computers to solve problems. Particularly as a result of the proliferation of small, inexpensive computers, such as microprocessors, the need for digital communication systems allowing a number of computers and computer peripherals to be interconnected in a computer communications network has become of increasing significance. One approach to this problem is to connect the various computer devices to a single bus via data transmitters and data receivers. One system based on this approach is disclosed in U.S. Pat. No. 4,063,220 issued to R. W. Metcalfe et al. on Dec. 13, 1977. In that system one transmitter is allowed to transmit data at a time and part of the data transmitted defines the address of the destination receiver. However, frequently the computers to be interconnected perform diverse functions such as bulk data transfer or signaling. It is undesirable to deny bus access to a first computer used for relatively short duration signaling messages until a second computer has completed a bulk data transfer. Accordingly, some means is needed to provide preemptive access to the bus on a priority basis.

In one known priority data handling system, each of a plurality of remote communication stations connected to a communications channel has a unique priority access number. Upon a signal from a central controller also connected to the channel, each remote station desiring channel access begins transmitting its priority access number. Each remote station will continue to transmit its priority access number only as long as no difference is detected between its transmitted bits and the bits conveyed on the channel. Since each remote station has a unique priority access number, only one station will complete the transmission of its number and thereby gain access to the channel. The fact that such a system requires a central controller to coordinate access requests makes its design and implementation unnecessarily complex and expensive. Furthermore, with such a system no means is provided whereby a remote station can interrupt the transmission of a lower priority station. Accordingly a recognized problem in the art is providing preemptive access to a shared bus on a priority basis without requiring coordination by a central controller.

SUMMARY OF THE INVENTION

The aforementioned problem is advantageously solved and a technical advance is achieved in accordance with the principles of the invention in a method and apparatus for contention resolution on a shared bus wherein each frame conveyed on the bus includes a priority field and the bus is monitored by each station such that a station will attempt to gain preemptive access to the bus by transmitting a special character only when it has a frame of higher priority to transmit and wherein the contention between two stations attempting to gain access to the bus is resolved without coordination by a central controller. In addition, preemptive access to the bus is provided on a priority basis without requiring data retransmission, i.e., a preempted frame can be continued from the point of interruption after the transmission of a preempting frame.

A system in accordance with the present invention is used to communicate among a plurality of user devices via a bus and includes a number of communications controllers. Each communications controller has a transmitter which selectively couples at least one of the user devices to the bus to transmit information in frames, each frame including a priority field. Each communications controller further includes a receiver which monitors the bus and which stores priority fields conveyed on the bus. The transmitter of a first communications controller further includes a circuit which responds to a request signal from a first user device and to a priority field stored by the receiver of the first communications controller by coupling the first user device to the bus to transmit a frame having a higher priority than the priority indicated by the priority field stored by the receiver of the first communications controller.

BRIEF DESCRIPTION OF THE DRAWING

A more complete understanding of the present invention may be obtained from a consideration of the following description when read in conjunction with the drawing in which:

FIGS. 6 and 7 when arranged in accordance with FIG. 8 present a detailed diagram of a first frame check sequence shift register used in the communications controller of FIGS. 2 through 4;

FIGS. 9 and 10 when arranged in accordance with FIG. 11 present a detailed diagram of a second frame check sequence shift register used in the communications controller of FIGS. 2 through 4;

FIGS. 12 and 13 are state diagrams relevant to circuits included in the communications controller of FIGS. 2 through 4;

FIG. 14 is a table defining the encoding of a receiver state field used in the communications controller of FIGS. 2 through 4;

FIGS. 19 through 21 are diagrams relevant to examples further illustrating the operation of the system of FIG. 1.

GENERAL DESCRIPTION

Figure 1:
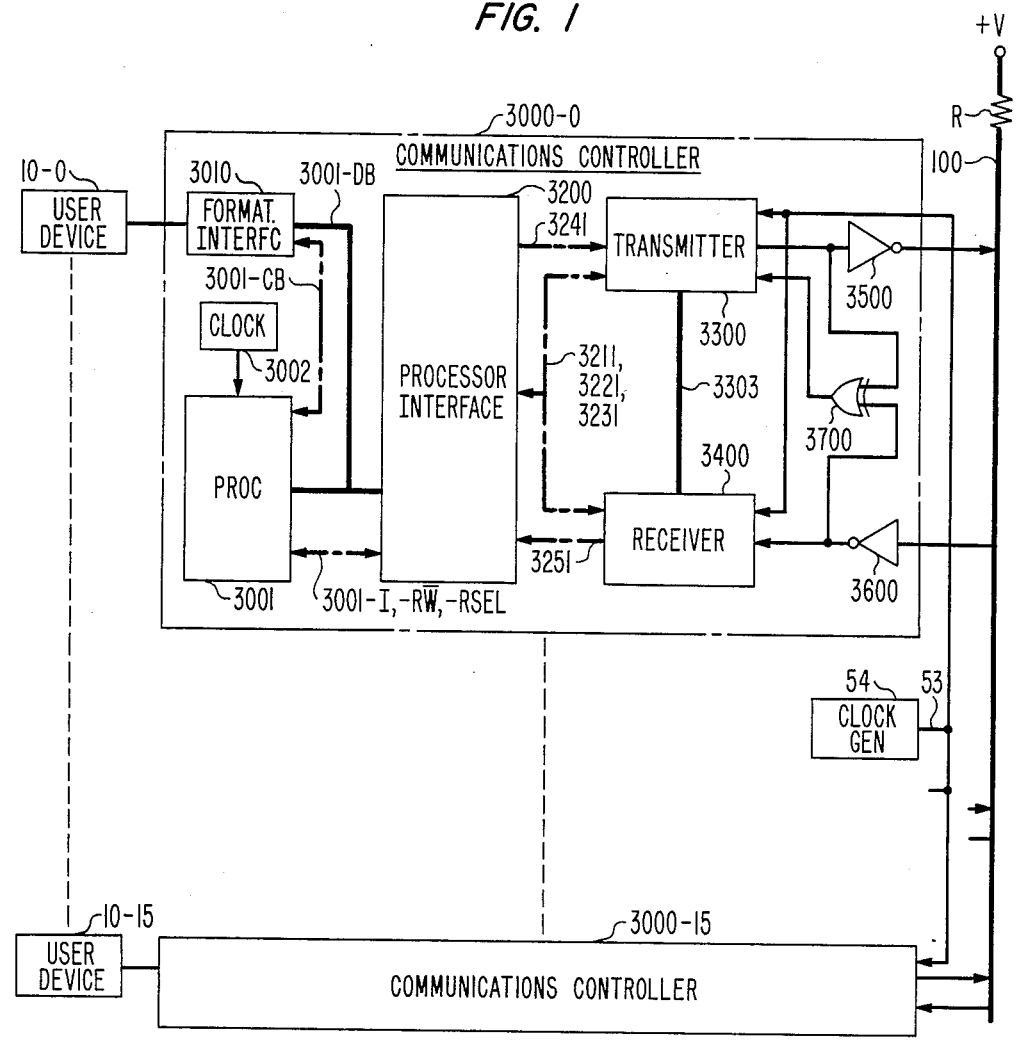
FIG. 1 is a block diagram of a communications system in accordance with the present invention.

FIG. 1 is a block diagram of a communications system in accordance with the present invention wherein 16 user devices 10-0 through 10-15 intercommunicate via a shared serial bus 100. Each of the 16 user devices 10-0 through 10-15 is coupled to bus 100 by an associated one of 16 substantially identical communications controllers 3000-0 through 3000-15. User devices 10-0 through 10-15 represent any of a wide variety of devices such as teleterminals, printers, alarms or computers. In the exemplary embodiment of FIG. 1, each communications controller transmits data to bus 100 via an open-collector inverter, e.g., inverter 3500 of communications controller 3000-0. Bus 100 is connected via a pull-up resistor R to a positive voltage, $+V$. When a high voltage signal is transmitted to the input terminal of the inverter 3500 of any of the communications controllers 3000-0 through 3000-15, a low voltage signal is conveyed on bus 100 regardless of the signals being transmitted to the inverter 3500 input terminals in the other communications controllers. Each communications controller receives data from bus, 100 via an inverter, e.g., inverter 3600 of communications controller 3000-0. Negative logic applies on bus 100, i.e., a logic one is represented by a low voltage signal and a logic zero is represented by a high voltage signal. However, positive logic applies within the communications controllers, i.e., a logic one is represented by a high voltage signal and a logic zero is represented by a low voltage signal. Accordingly, the characteristics of bus 100 are such that when a logic one signal is transmitted to the input terminal of the inverter 3500 of any of the communications controllers 3000-0 through 3000-15, a logic one signal is conveyed on bus 100 regardless of the signals being transmitted to the inverter 3500 input terminals in the other communications controllers. During idle periods, when none of the communications controllers are actively transmitting, bus 100 remains at a logic zero value. A clock generator 54 provides a clock signal via clock line 53 to synchronize the operation of communications controllers 3000-0 through 3000-15.

Figure 15:
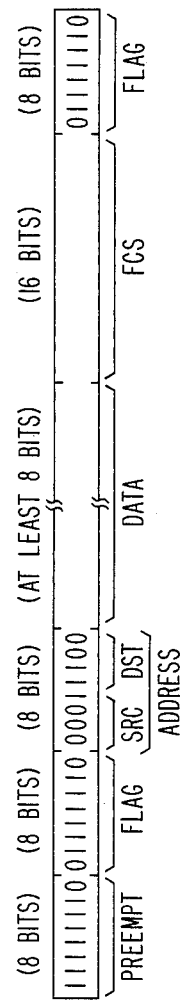
FIG. 15 is a diagram of the frame format used in the system of FIG. 1.

Data are conveyed on bus 100 in variable length frames in accordance with the predefined frame format shown in FIG. 15. The beginning of a frame is marked by an eight-bit PREEMPT character 11111110 followed by an eight-bit FLAG character 01111110. After the FLAG character is an eight-bit address field. In the present embodiment, the address field comprises a four-bit source subfield defining the source user device for the frame and a four-bit destination subfield defining the destination user device for the frame. A subfield defines a given user device when it contains the binary equivalent of the second part of the given user device designation. For example, the source of the frame of FIG. 15 is used device 10-1 as defined by the source subfield 0001 and the destination of the frame is user device 10-12 as defined by the destination subfield 1100. Following the address field is a variable length data field which contains the data to be communicated. In the present embodiment, the data field must include at least eight bits and may comprise predefined control and information fields, the details of which are not relevant herein. Following the data field is a 16-bit frame check sequence (FCS) field used for error checking. The end of the frame is marked by the FLAG character 01111110. Since the data field is of variable length, the location of the address field is defined with respect to the beginning FLAG of each frame and the location of the FCS field is defined with respect to the ending FLAG. In accordance with a well-known method for achieving data transparency, a dummy zero is inserted after every occurrence of five consecutive ones between the beginning FLAG and the ending FLAG to insure that the character 01111110 is not present therebetween. Received frames must therefore be subjected to zero deletion where any zero following five consecutive ones is deleted.

In accordance with the well-known error checking method of the present example, the 16-bit sequence inserted in the FCS field is the ones complement of the sum (modulo 2) of: (a) the remainder of $x^k$ $(x^{15}+x^{14}+x^{13}+\ldots+x^2+x+1)$ divided (modulo 2) by the generator polynomial $x^{16}+x^{12}+x^5+1$, where k is the number of bits in the frame existing between, but not including, the final bit of the opening flag and the first bit of the FCS, excluding inserted dummy bits, and (b) the remainder after multiplication by $x^{16}$ and then division (modulo 2) by the generator polynomial $x^{16}+x^{12}+x^5+1$, of the content of the frame, existing between but not including, the final bit of the opening flag and the first bit of the FCS, excluding inserted dummy bits.

Each communications controller 3000-0 through 3000-15 includes a formatter interface 3010, which receives and stores data from the associated user device, and a processor 3001 which controls the transfer of eight-bit bytes of data from formatter interface 3010 via a processor interface 3200 to a transmitter 3300. Transmitter 3300 inserts the data along with a derived FCS field in the predefined FIG. 15 frame format and transmits the resulting frames via inverter 3500 to bus 100. Each communications controller 3000-0 through 3000-15 also includes a receiver 3400 which receives frames from bus 100 via inverter 3600. Each receiver 3400 performs two functions. First, it continuously monitors bus 100 to determine which of three states, IDLE, UNKNOWN or KNOWN, bus 100 is in. Bus 100 is initially defined to be in the IDLE state until the seven logic ones of a PREEMPT character have been conveyed thereon. Bus 100 is thereafter defined to be in the UNKNOWN state until at least 24 non-flag bits (excluding dummy zero bits) are conveyed thereon after the frame opening flag, at which time bus 100 is in the KNOWN state and the receiver 3400 in each of the communications controllers 3000-0 through 3000-15 stores the address field of the frame being conveyed. After the frame closing flag is conveyed, bus 100 is again in the IDLE state as consecutive logic zeroes are conveyed. The second function of the receiver 3400 in a given communications controller, e.g., communications controller 3000-0, is performed only when the frame destination subfield defines the user device associated with the given communications controller, e.g., user device 10-0 associated with communications controller 3000-0. In that case, receiver 3400 extracts the data field of the received frame and transfers such data in eight-bit bytes via processor interface 3200 to formatter interface 3010, which in turn transmits the data to user device 10-0. Receiver 3400 also transmits via processor interface 3200 to processor 3001 an indication of whether the received frame FCS field was correct.

Figure 16:
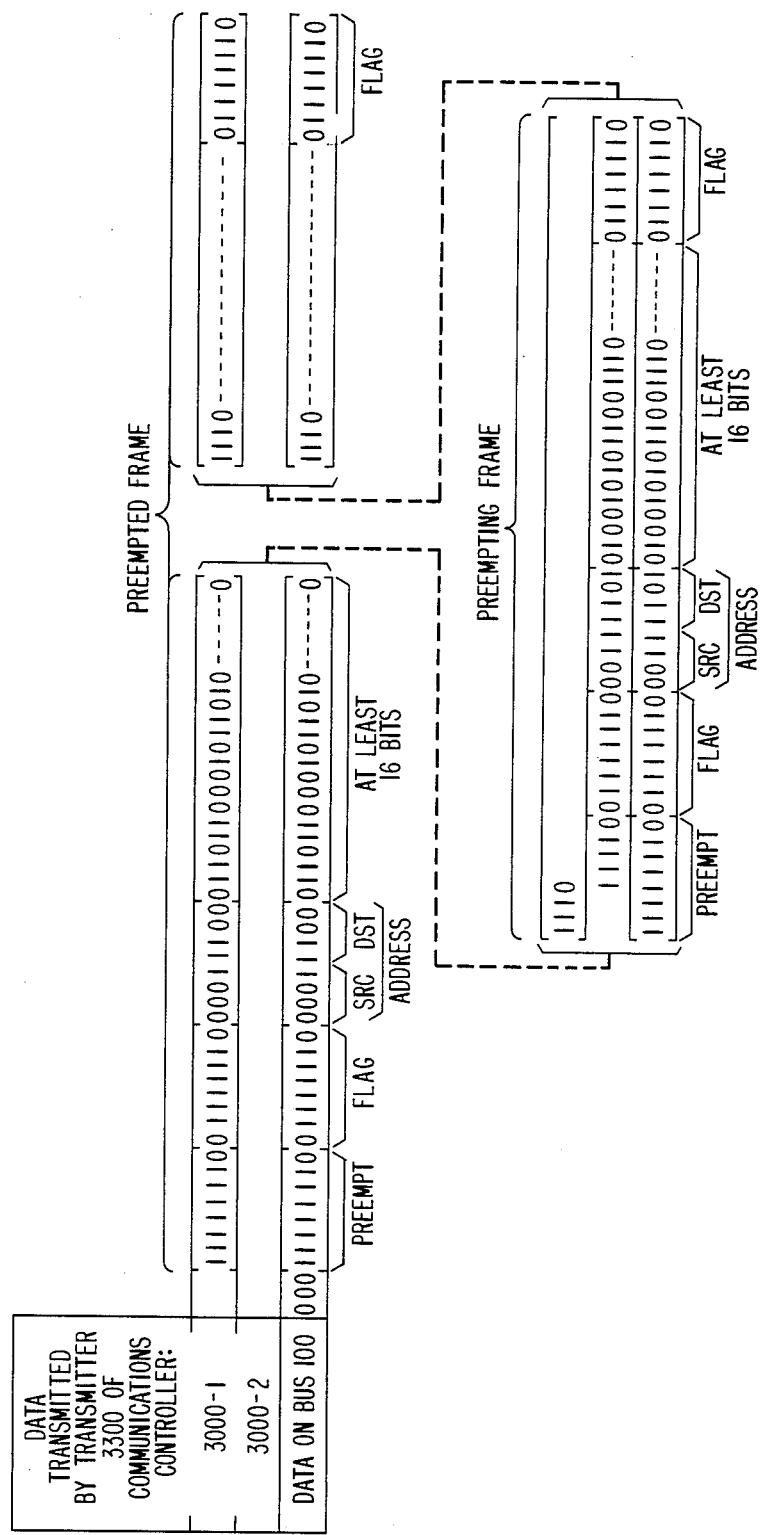
FIG. 16 is a diagram illustrating the graceful preemption of a frame in the system of FIG. 1.

Communications controllers 3000-0 through 3000-15 also allow a given user device to gracefully preempt the transmission from another user device on bus 100 without requiring the preempted device to retransmit the entire frame. In accordance with an example referred to herein as Example 2 (FIG. 16), assume that user device 10-1 is transmitting a lengthy frame to user device 10-12 via bus 100. (Three data streams are shown in FIG. 16—the data stream transmitted by the transmitter 3300 of communications controller 3000-1, the data stream transmitted by the transmitter 3300 of communications controller 3000-3 and the data stream conveyed on bus 100.) After the PREEMPT character, the opening flag, the address field and at least 16 non-flag bits (excluding dummy zero bits) of the frame from communications controller 3000-1 have been conveyed, communications controller 3000-3 begins receiving data from user device 10-3, which data is to be conveyed to user device 10-13. In communications controller 3000-3, the processor 3001 informs the transmitter 3300 via processor interface 3200 of the desire to transmit data. Transmitter 3300 reads, via a report bus 3303, registers 3470 and 3471 (FIG. 4) within receiver 3400 and determines that the bus 100 state is presently the KNOWN state and that bus 100 is presently owned by communications controller 3000-1. Once a given communications controller has transmitted a frame address field, it owns bus 100 until it is preempted or until the frame is completed. In accordance with the present exemplary embodiment, there are 16 distinct priority levels—one for each of the user devices 10-0 through 10-15—with the user device designation indicating the priority level for that user device. User device 10-15 has the highest priority, user device 10-14 the next highest, etc. Accordingly, the transmitter 3300 of communications controller 3000-3 determines that communications controller 3000-3 has priority over the present bus owner, communications controller 3000-1. Each transmitter 3300 monitors the bits conveyed on bus 100 by monitoring via report bus 3303 a conductor 3451 (FIG. 4) within receiver 3400 and maintains an internal status variable defining the number, $N_5$, of consecutive logic one bits conveyed on bus 100. Transmitter 3300 of communications controller 3000-3 uses this status variable to complete the transmission of the PREEMPT character 11111110. In accordance with Example 2 (FIG. 16, preempting frame), the status variable defining $N_5$ indicates that three consecutive logic one bits have been conveyed on bus 100. Therefore, transmitter 3300 of communications controller 3000-3 transmits four consecutive logic one bits followed by a logic zero bit to complete the transmission of the PREEMPT character 11111110. Each communications controller includes an exclusive-OR gate 3700, having a first input terminal connected to the inverter 3500 input terminal and a second input terminal connected to the inverter 3600 output terminal. Whenever the logic value conveyed on bus 100 differs from the logic value transmitted by transmitter 3300 to inverter 3500, exclusive-OR gate 3700 transmits a logic one signal to transmitter 3300. In accordance with Example 2 (FIG. 16), when the transmitter 3300 of communications controller 3000-1 transmits a logic zero signal during the same bit period that the transmitter 3300 of communications controller 3000-3 transmits one of the logic one signals of the PREEMPT character 11111110 and a logic one signal is therefore conveyed on bus 100, the exclusive-OR gate 3700 of communications controller 3000-1 detects a bit difference and transmits a logic one signal referred to herein as a difference signal. In response, transmitter 3300 of communications controller 3000-1 interrupts its transmission and, in addition, it saves the values of a first set of status variables which collectively define the present status of that transmitter 3300. In accordance with Example 2 (FIG. 16), transmitter 3300 of communications controller 3000-3, after completing the transmission of the PREEMPT character, then transmits the opening flag, the address, data and FCS fields and the closing flag of the preempting frame.

The receiver 3400 in each of the communications controllers 3000-0 through 3000-15, upon detecting the PREEMPT character and opening flag of the preempting frame saves the values of a second set of status variables which collectively define the present status of that receiver 3400 and then receives the balance of the preempting frame. In communications controller 3000-13 only, the receiver 3400 transfers the data in eight-bit bytes to the formatter interface 3010 via processor interface 3200, and that data is in turn transmitted to user device 10-13, which is the destination of the preempting frame. The receiver 3400 in each of the communications controllers 3000-0 through 3000-15, upon detecting the closing flag of the preempting frame, uses the saved values of the second set of status variables to return that receiver 3400 to its status at the time the opening flag of the preempting frame was detected. Registers 3470 and 3471 (FIG. 4) within each receiver 3400 are restored to again define the bus 100 state as the KNOWN state and the bus 100 owner as communications controller 3000-1. In communications controller 3000-1, the transmitter 3300 reads the receiver 3400 registers 3470 and 3471 (FIG. 4) via report bus 3303 to determine that communications controller 3000-1 again owns the bus and then uses the saved values of the first set of status variables to return that transmitter 3300 to its status at the time of interruption. The transmitter 3300 of communications controller 3000-1 uses the saved value of the status variable defining $N_5$ to transmit $N_5 - 1$ consecutive logic one bits followed by a logic zero bit (FIG. 16, preempted frame) to replace bits transmitted when the preempting frame PREEMPT character was being conveyed on bus 100. Since a given transmitter 3300 can only be interrupted when it transmits a logic zero and a logic one is conveyed on bus 100, the number of consecutive logic ones transmitted by the given transmitter 3300 before the logic zero, is one less than the number of consecutive logic ones conveyed on bus 100. In accordance with Example 2 (FIG. 16), transmitter 3300 of communications controller 3000-1 transmits the balance of the preempted frame without interruption. The receiver 3400 in each of the communications controllers 3000-0 through 3000-15 receives the balance of the preempted frame. In communications controller 3000-12, the receiver 3400 resumes the transfer of data in eight-bit bytes to the formatter interface 3010 via processor interface 3200, and that data is in turn transmitted to user device 10-12, which is the destination of the preempted frame. Receiver 3400 in communications controller 3000-12 also transmits to the processor 3001 via processor interface 3200 an indication of whether the preempted frame FCS field is correct. The FCS field is based on the entire preempted frame. Although FIG. 16 illustrates only a single preemption, multiple preemption, i.e., preemption by another communications controller within a preempting frame, is also possible. However, in the present embodiment a given user device is not allowed to preempt itself. Each communications controller 3000-0 through 3000-15 can also terminate the transmission of a frame on bus 100 by transmitting an ABORT character 11111111. However in that case, no status variables are saved and the interrupted frame must be retransmitted in its entirety.

Functional Description

Figure 5:
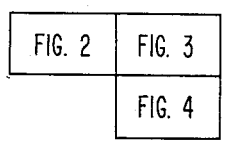
Figure 2:
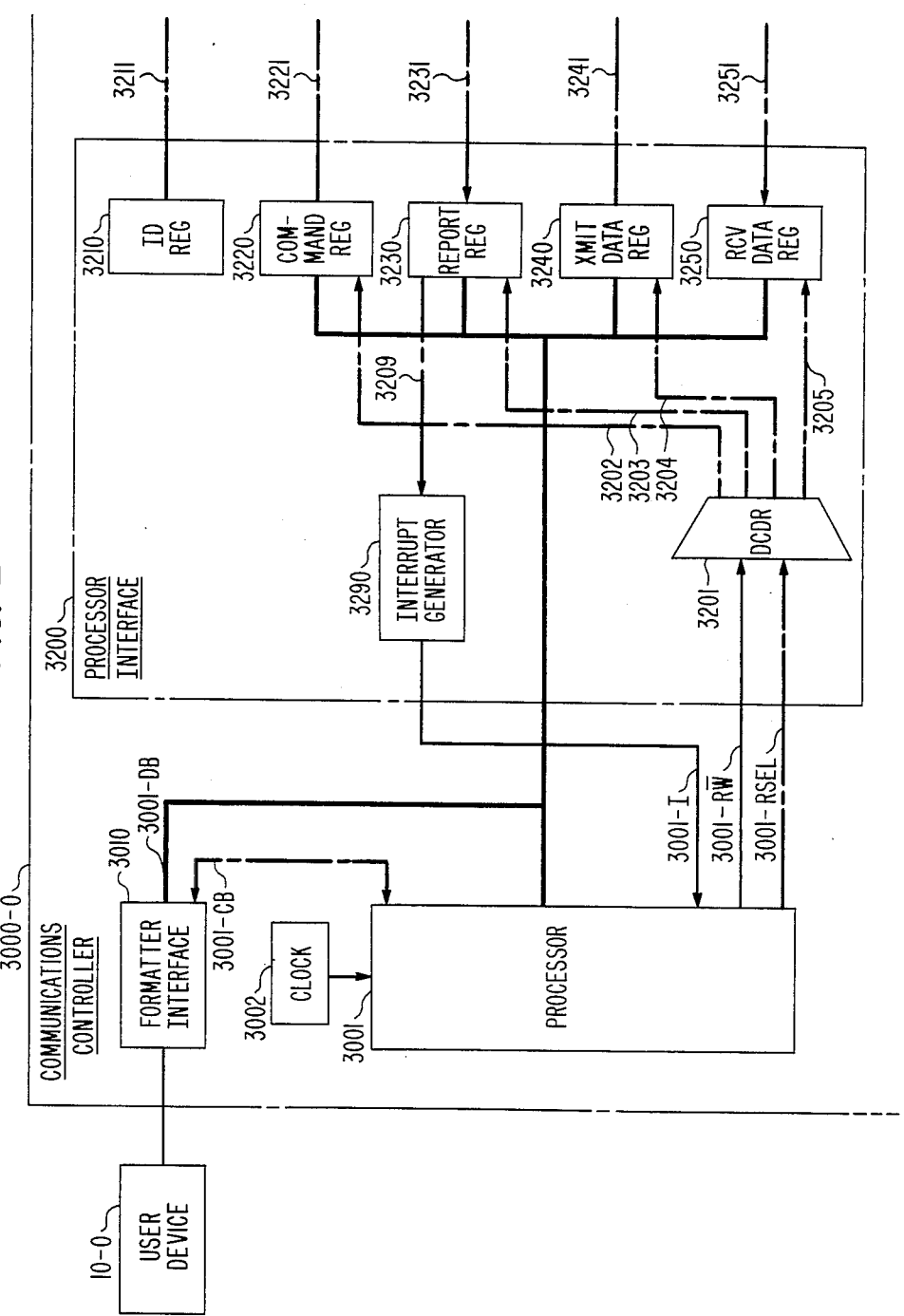
FIGS. 2 through 4, when arranged in accordance with FIG. 5, present a detailed diagram of a communications controller included in the system of FIG. 1.
Figure 3:
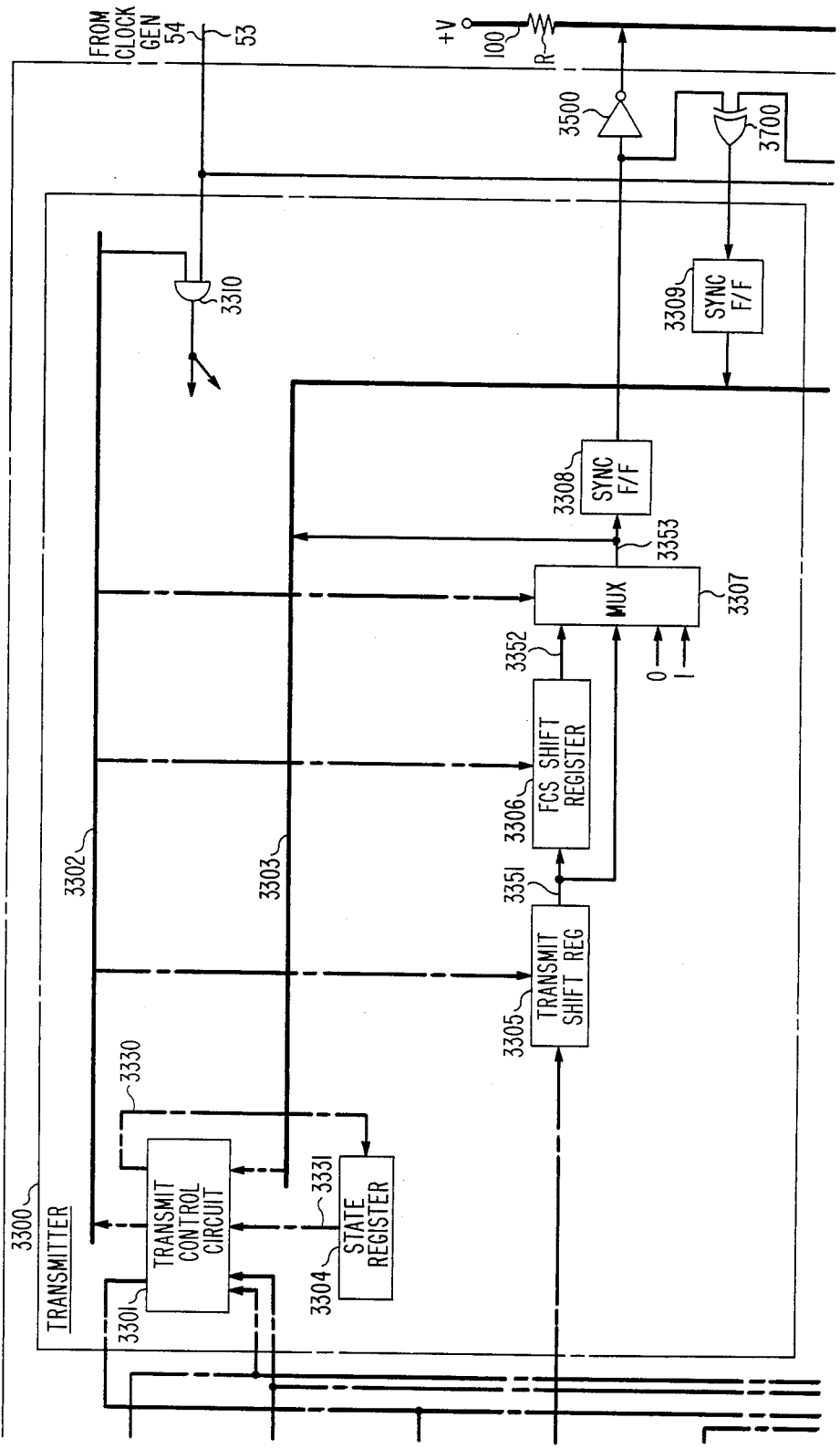
Figure 4:
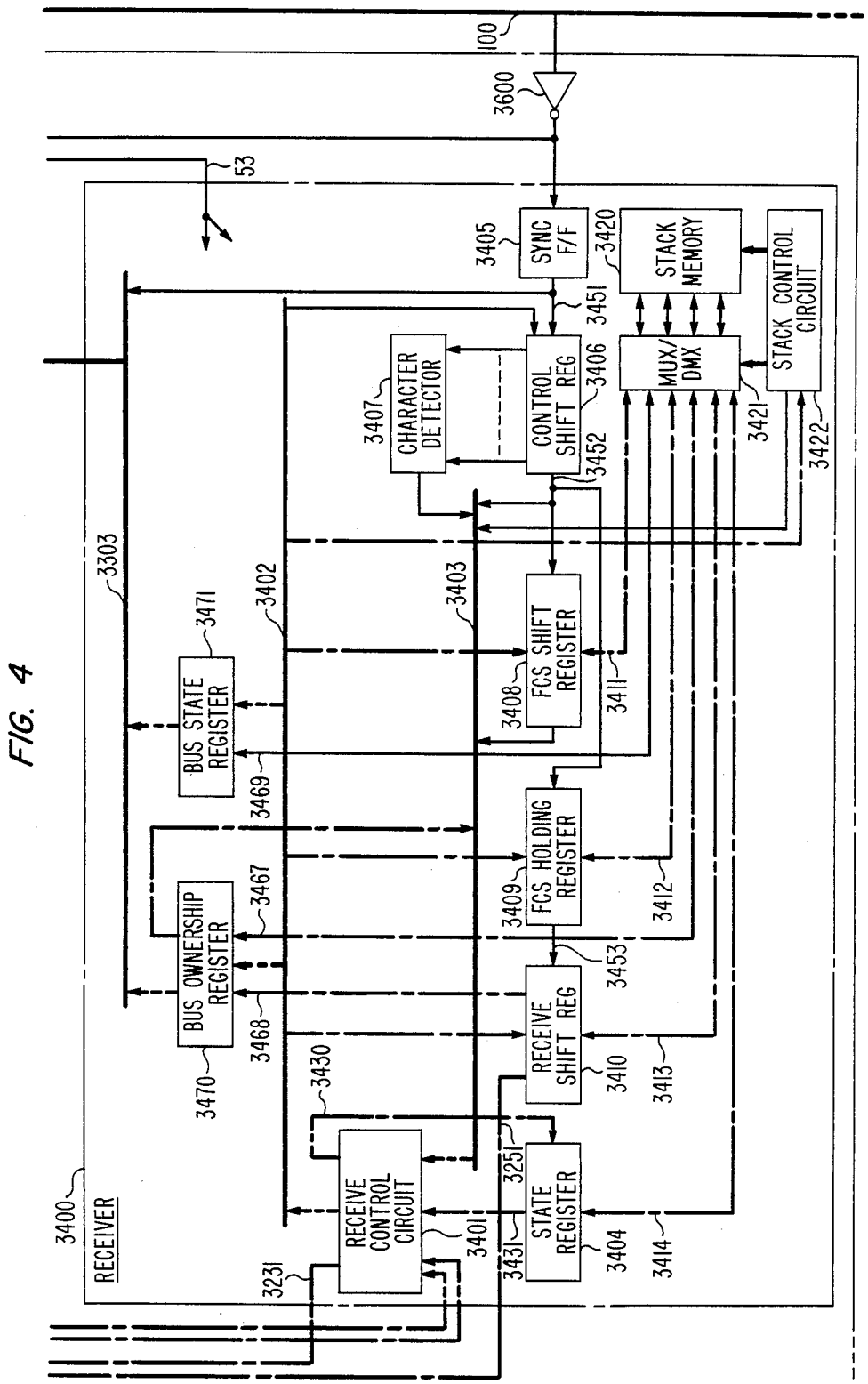

Communications controller 3000-0, shown in detail in FIGS. 2 through 4 arranged in accordance with FIG. 5, comprises a formatter interface 3010 connected to user device 10-0, a processor 3001, e.g., the Motorola 6809, and its associated clock 3002, a processor interface 3200, a transmitter 3300 connected via inverter 3500 to bus 100 and a receiver 3400 connected via inverter 3600 to bus 100. The functional description which follows refers to communications controller 3000-0 throughout as being representative of any of the 16 substantially identical communications controllers 3000-0 through 3000-15.

Figure 17:
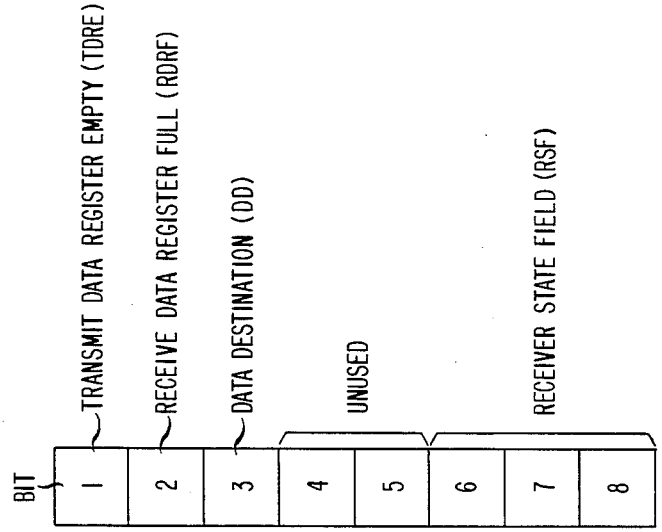
FIGS. 17 and 18 are bit assignment tables for registers included in the communications controller of FIGS. 2 through 4.
Figure 18:
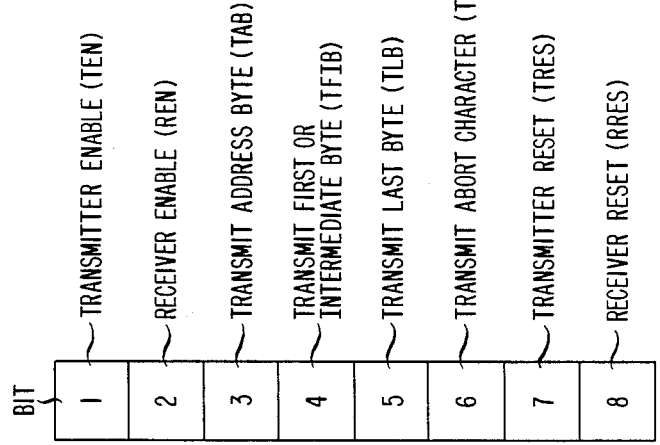

Processor 3001 controls the operation of transmitter 3300 and receiver 3400 by writing various predefined bits into a command register 3220 of processor interface 3200. The bit assignments for register 3220 are shown in FIG. 17. Processor 3001 learns of the occurrence of certain events or states within transmitter 3300 by reading predefined bits in a report register 3230. The bit assignments for register 3230 are shown in FIG. 18. Processor 3001 and formatter interface 3010, under the control of processor 3001, convey data to transmitter 3300 to be transmitted on bus 100, by writing eight-bit bytes of information in a transmit data register 3240. Further, data received by receiver 3400 on bus 100 can be conveyed to processor 3001 or formatter interface 3010 in eight-bit bytes via a receive data register 3250. Recall that bytes are conveyed only to the formatter interface 3010 within the communications controller associated with the destination user device.

Operations within transmitter 3300 are controlled by a transmit control circuit 3301. Circuit 3301 includes a controller (not shown) which advantageously can be implemented as either a programmable logic array or a processor. The state diagram for transmit control circuit 3301 is given in FIG. 12. Transmit control circuit 3301 controls the enabling and shifting of an eight-bit transmit shift register 3305 and a 16-bit FCS shift register 3306 via a control bus 3302. The clock signal transmitted by clock generator 54 on clock line 53 is received at a first input terminal of an AND gate 3310 and distributed as required within transmitter 3300 when transmit control circuit 3301 transmits a logic one via control bus 3302 to a second input terminal of AND gate 3310. A multiplexer 3307, also controlled by transmit control circuit 3301 via control bus 3302, selects bits from transmit shift register 3305 or FCS shift register 3306 or predefined logic zero or one bits for transmission to bus 100. For example, transmit control circuit 3301 can effect the transmission of the FLAG character 01111110 to bus 100 by transmitting signals to multiplexer 3307 such that multiplexer 3307 selects first a logic zero bit, then six consecutive logic one bits and finally a logic zero bit for transmission to bus 100. The information comprising the address field and the data field is conveyed from transmit data register 3240 in parallel to transmit shift register 3305 in eight-bit bytes and then is shifted serially via a conductor 3351 and multiplexer 3307 to bus 100. The bits transmitted from transmit shift register 3305 on conductor 3351 also enter FCS shift register 3306 which operates sequentially to generate the 16-bit FCS field described above. The operation of FCS shift register 3306 is such that at any given time it contains the FCS field derived from all bits of the frame which have been transmitted by transmit shift register 3305 up to that time. FCS shift register 3306 is described in detail later herein. When transmit control circuit 3301 determines that the last byte of the data field has been transmitted to bus 100, it effects the transmission of the FCS field by FCS shift register 3306 via a conductor 3352 and multiplexer 3307. Transmit control circuit 3301 monitors via report bus 3303 the bits transmitted by multiplexer 3307 and maintains an internal status variable defining the number, $N_2$, of consecutive logic ones transmitted. Whenever five consecutive logic ones have been transmitted, circuit 3301 effects the transmission by multiplexer 3307 of a dummy logic zero bit. Since multiplexer 3307 transmits the PREEMPT, ABORT and FLAG characters under the control of transmit control circuit 3301 rather than by conveying bits transmitted by transmit shift register 3305 or FCS shift register 3306, no dummy logic zero bits are inserted in those characters. The shifting operation of transmit shift register 1305 and FCS shift register 1306 is disabled for one bit period as multiplexer 1307 transmits a dummy logic zero bit. Transmit control circuit 3301 maintains a second internal status variable defining the number, $N_1$, of bits of a given byte stored in transmit shift register 3305 that have been shifted out at any given time. As mentioned above, transmit control circuit 3301 maintains a third internal status variable defining the number, $N_5$, of consecutive logic ones conveyed on bus 100. Transmit control circuit 3301 also maintains a fourth internal status variable, X, defining the previous FIG. 12 state of circuit 3301. When exclusive-OR gate 3700 transmits a logic one signal via report bus 3303 to transmit control circuit 3301 indicating a detected difference between a bit transmitted to inverter 3500 and a bit conveyed on bus 100, transmit control circuit 3301 determines that a preemption has occurred. Transmit control circuit 3301 stores the values of the four above-mentioned status variables in a state register 3304. Transmit control circuit 3301 then transmits a logic zero signal via control bus 3302 to AND gate 3310 and thereby disables the distribution within transmitter 3300 of the clock signal from clock generator 54. The contents of transmit data register 3240, state register 3304, transmit shift register 3305 and FCS shift register 3306, which contents are referred to collectively herein as a first set of status variables, are thereby saved in those registers. When transmit control circuit 3301 determines that the transmission of the preempted frame can be resumed it uses the saved value of the status variable X to return to the same FIG. 12 state it was in at the time of the preemption (with one exception, described later herein). Transmit control circuit 3301 uses the saved value of the status variable defining the number, $N_5$, of consecutive logic one bits conveyed on bus 100 to transmit $N_5-1$ consecutive logic one bits followed by a logic zero bit to bus 100 to replace bits transmitted when the preempting frame PREEMPT character 11111110 was being conveyed on bus 100. Transmit control circuit 3301 uses the saved value of the status variable defining the number, $N_2$, of consecutive logic one bits transmitted by multiplexer 3307 at the time of preemption to resume its dummy zero insertion function with respect to the preempted frame. Transmit control circuit 3301 uses the saved value of the status variable defining the number, $N_1$, of bits of a given byte that have been shifted out by transmit shift register 3305 to effect the proper transmission of the remainder of the given byte.

Operations within receiver 3400 are controlled by a receive control circuit 3401. Circuit 3401 includes a controller (not shown) which advantageously can be implemented as either a programmable logic array or a processor. The state diagram for receive control circuit 3401 is given in FIG. 13. Receive control circuit 3401 controls the enabling and shifting of an eight-bit control shift register 3406, a 16-bit FCS shift register 3408, a 16-bit FCS holding register 3409 and an eight-bit receive shift register 3410 via a control bus 3402. A character detector 3407 detects the presence of the FLAG character 01111110, the ABORT character 11111111 or the PREEMPT character 11111110 in control shift register 3406 and informs receive control circuit 3401 of such detection via a report bus 3403. In response, receive control circuit 3401 effects the shifting of eight subsequent bits from bus 100 into control shift register 3406. However, the bits comprising the FLAG, ABORT or PREEMPT character are not shifted into registers 3408, 3409 and 3410. Character detector 3407 also informs receive control circuit 3401 when seven consecutive logic ones are received and circuit 3401, in response, writes via control bus 3402 the field BS=11 into a two-bit bus state register 3471 thereby defining the present bus 100 state as UNKNOWN. Preemption is not allowed when the bus 100 state is UNKNOWN. Receive control circuit 3401 monitors via report bus 3403 the bit stream transmitted by control shift register 3406 and maintains an internal status variable defining the number, $N_4$, of consecutive logic one bits transmitted by control shift register 3406. When the variable defining $N_4$ indicates that five consecutive logic one bits have been transmitted by control shift register 3406, receive control circuit 3401 effects the operation of registers 3408, 3409 and 3410 such that the dummy zero bit which follows five consecutive logic one bits is not shifted into those registers 3408, 3409 and 3410. The bits transmitted by control shift register 3406 are first shifted into FCS holding register 3409 via conductor 3452 and then into receive shift register 3410 via conductor 3453. Eight-bit bytes of data are then conveyed from receive shift register 3410 in parallel via a path 3251 to receive data register 3250 where they then can be read by processor 3001 or by formatter interface 3010, under the control of processor 3001. Receive control circuit 3401 maintains another internal status variable defining the number, $N_3$, of bits received by receive shift register 3410 since a byte was last transferred to receive data register 3250. When 24 non-flag bits have been transmitted by control shift register 3406 after the detection of the opening flag, receive control circuit 3401 determines based on the bit count that the frame address field is present in receive shift register 3410 and controls the storage of the address field in an eight-bit bus ownership register 3470. When receive control circuit 3401 reads via report bus 3403 a destination subfield in bus ownership register 3470 defining user device 10-0 as the frame destination, receive control circuit 3401 writes a logic one DATA DESTINATION (DD) bit in report register 3230 (FIG. 18). Receive control circuit 3401 determines which user device is associated with communications controller 3000-0 by reading via a path 3211 a four-bit ID register 3210. ID register 3210 in communications controller 3000-0 contains the field 0000 defining user-device 10-0. The ID registers 3210 in the other communications controllers each contain the binary equivalent of the second part of the designation of user device associated with that communications controller. In communications controller 3000-0, circuit 3401 also writes via control bus 3402 the field BS=10 into bus state register 3471 thereby defining the present bus 100 state as the KNOWN state. Preemption is allowed when the bus 100 state is the KNOWN state if a given communications controller has a higher priority than the present bus 100 owner. Transmitter 3300 determines whether preemption is allowed by reading, via report bus 3303, bus ownership register 3470 and bus state register 3471. The bits transmitted by control shift register 3406 also enter FCS shift register 3408 which sequentially generates the above-described 16-bit FCS field therefrom. FCS shift register 3408 is described in detail later herein. When character detector 3407 detects the closing flag of a frame, the FCS field of that frame has already been shifted into both FCS shift register 3408 and FCS holding register 3409. FCS holding register 3409 is included in receiver 3400 so that the frame FCS field is not transferred to receive data register 3250. The FCS field generated by FCS shift register 3408 is compared with a constant field to determine whether the received frame contained errors and the result is conveyed to receive control circuit 3401 via report bus 3403. Receive control circuit 3401 informs processor 3001 of such information concerning receiver 3400 by writing a three-bit Receiver State Field (RSF) in report register 3230 (FIG. 18).

As character detector 3407 detects first the presence of the PREEMPT character 11111110 in control shift register 3406 and then the presence of the FLAG character 01111110, it so informs receive control circuit 3401 of each such detection via report bus 3403. In response, receive control circuit 3401 transmits the present values of its internal status variables defining $N_3$ and $N_4$ to a state register 3404. Receive control circuit 3401 then effects a transmission of the contents of bus ownership register 3470, bus state register 3471, state register 3404, receive shift register 3410, FCS holding register 3409 and FCS shift register 3408, which contents are collectively referred to herein as a second set of status variables, to a stack memory 3420, e.g., the Fairchild 4706B, to be saved therein. Since each location in stack memory 3420 is four bits wide, the bits comprising the second set of status variables are saved in predefined memory 3420 locations via a multiplexer/demultiplexer 3421 under the control of a stack control circuit 3422. As the preempting frame is received, the frame address field is stored in bus ownership register 3470 and the field BS=10 defining the bus 100 state as KNOWN is again stored in bus state register 3471. Recall that in communications controller 3000-0, only when receive control circuit 3401 reads a destination subfield in bus ownership register 3470 defining user device 10-0 and writes a logic one DD bit in report register 3230 are bytes conveyed from transmit data register 3240 to user device 10-0.

When character detector 3407 detects the closing flag of the preempting frame, the values of the second set of status variables, which values are saved in stack memory 3420, are transmitted via multiplexer/demultiplexer 3421 to predefined bit positions in registers 3470, 3471, 3404, 3410, 3409 and 3408. Receive control circuit 3401 reads the contents of state register 3404 via a path 3431 to return its internal status variables to the values they had at the point of graceful preemption. After character detector 2407 detects the closing flag of the preempting frame, the next eight bits received from bus 100 are shifted into control shift register 3406. Receive control circuit 3401 uses the value of its internal status variable defining the number, $N_4$, of consecutive logic one bits that had been transmitted by control shift register 3406 to resume its zero deletion function with respect to the preempted frame exactly where it was interrupted by the graceful preemption. Receive control circuit 3401 uses the value of its internal status variable defining the number, $N_3$, of bits which had been shifted into receive shift register 3410 to determine when a complete eight-bit byte is available to be transferred to receive data register 3250. The reception of the balance of the preempted frame can then continue in the above-described manner.

Transmitter 3300 and receiver 3400 are interconnected by report bus 3303. Transmit control circuit 3301 in transmitter 3300 maintains its internal status variable defining the number, $N_5$, of consecutive logic one bits conveyed on bus 100 by monitoring via report bus 3303 conductor 3451 connected to control shift register 3406 within receiver 3400. Once transmitter 3300 has been interrupted by a preemption, transmit control circuit 3301 determines when transmission should resume by monitoring via report bus 3303 the contents of bus ownership register 3470 and bus state register 3471 in receiver 3400. When the bus state register 3471 contains the field BS=10, indicating that the bus 100 state is the KNOWN state and the source subfield contained in bus ownership register 3470 is again equal to the four-bit field stored in ID register 3210, transmit control circuit 3301 determines that the transmission of the preempted frame should resume. Transmit control circuit 3301 also compares the source subfield in bus ownership register 3470 to the field stored in ID register 3210 to determine when a given preemption is allowed. Preemption is allowed when the ID register 3210 field defines a user device having a higher priority than the user device defined by the bus ownership register 3470 source subfield.

Detailed Description

The operation of communications controllers 3000-0 through 3000-15 will be described in greater detail with reference to two examples. In Example 1 (FIG. 15) a single frame is transmitted from user device 10-1 to user device 10-12 via bus 100. In Example 2 (FIG. 16) user device 10-3 gracefully preempts the transmission from user device 10-1 and transmits a preempting frame to user device 10-13. After the preempting frame has been conveyed, the transmission of the preempted frame to user device 10-12 is resumed. The following description is arranged such that the transmission of information to bus 100 is first described for both Example 1 and Example 2 and the reception of information from bus 100 is then described for both examples.

Transmission of Information to Bus 100

Within each communications controller 3000-0 through 3000-15, processor 3001 is connected to formatter interface 3010 and to command register 3220, report register 3230, transmit data register 3240 and receive data register 3250 of processor interface 3200 by an eight-conductor, bidirectional data bus 3001-DB. Processor 3001 controls the reading of the contents of a given one of the registers 3220, 3230, 3240 and 3250 by transmitting to a decoder 3201 a logic one signal on a conductor 3001-RW and register select signals defining the given register on a path 3001-RSEL. Decoder 3201, in turn, transmits a signal on the appropriate one of four paths 3202, 3203, 3204 and 3205 to the given register. In response, the contents of the given register are made available for reading on data bus 3001-DB by processor 3001 or formatter interfaces 3010. Processor 3001 also controls the writing of registers 3220, 3230, 3240 and 3250. When processor 3001 transmits to decoder 3201 a logic zero signal on conductor 3001-R$\overline{\text{W}}$ and register select signals defining a given register on path 3001-RSEL, decoder 3201 transmits a signal on the appropriate one of the paths 3202, 3203, 3204 and 3205 to the given register. A byte or portion thereof transmitted by processor 3001 or formatter interface 3010 on data bus 3001-DB is then stored in the given register. Each processor interface 3200 also comprises four-bit ID register 3210 which, in the present exemplary embodiment, contains the predetermined four-bit field defining the user device associated with that processor interface 3200. It is to be understood that processor interface 3200 could be modified such that processor 3001 could write via data bus 3001-DB a different four-bit field in ID register 3210 reflecting changed priorities.

In each communications controller 3000-0 through 3000-15, transmitter 3300 is initialized when processor 3001 writes a logic one Transmitter Reset (TRES) bit in command register 3220 (FIG. 17). Transmit control circuit 3301 included in transmitter 3300 detects the TRES bit via a path 3221 and, in response, enters a RESET state 301 (FIG. 12). A logic zero TRES bit is subsequently written in command register 3220 by processor 3001. (All commands from processor 3001 to transmit control circuit 3301 are conveyed by processor 3001 writing a logic one bit in command register 3220 and, after allowing sufficient time for that logic one bit to be detected by transmit control circuit 3301, writing a logic zero bit in that command register 3220 bit position.) In the RESET state 301, transmit control circuit 3301 monitors a Transmitter Enable (TEN) bit in command register 3220 (FIG. 17) via path 3221. When processor 3001 writes a logic one TEN bit in command register 3220 to enable transmitter 3300 and such TEN bit is detected by circuit 3301, circuit 3301 enters an IDLE state 302 (FIG. 12). In IDLE state 302, circuit 3301 enables the distribution within transmitter 3300 of the clock signal from clock generator 54 by transmitting a logic one signal via control bus 3302 to AND gate 3310. Circuit 3301 also transmits signals to multiplexer 3307 via control bus 3302 such that multiplexer 3307 repetitively transmits logic zero bits to bus 100 via a conductor 3353, a D-type sync flip-flop 3308 and inverter 3500. Sync flip-flop 3308 assures that the signals transmitted to bus 100 do not change during each one-bit time interval. Flip-flop 3308 stores bits at its output terminal connected to inverter 3500 on a positive edge of the clock signal transmitted by clock generator 54 via AND gate 3310. In IDLE state 302, circuit 3301 monitors a Transmit Address Byte (TAB) bit in command register 3220 (FIG. 17) via path 3221. Up the this point, the operation of each of the communications controllers 3000-0 through 3000-15 has been identical.

In accordance with Example 1 (FIG. 15), user device 10-1 begins transmitting data to the formatter interface 3010 in communications controller 3000-1, which formatter interface temporarily stores such data, as required, in a buffer memory (not shown). In the present exemplary embodiment, the formatter interface 3010 buffer memory has sufficient capacity to store the entire data field of the maximum length frame transmitted to bus 100. Formatter interface 3010 informs processor 3001 of the desire to transmit data to user device 10-12 via bus 100 by transmitting a signal referred to herein as a request signal on a control bus 3001-CB. In response, processor 3001 writes a logic one TAB bit in command register 3220 and writes an address byte, which comprises a source subfield 0001 defining user device 10-1 as the source of the frame and a destination subfield 1100 defining user device 10-12 as the destination for the frame, in transmit data register 3240. Transmit control circuit 3301 detects the TAB bit and, in response, enters a WAIT state 303 (FIG. 12). In the WAIT state 303, transmit control circuit 3301 reads via report bus 3303 the contents of bus ownership register 3470 and bus state register 3471 in receiver 3400. Transmit control circuit 3301 will enter a BEGIN state 304 (FIG. 12) if bus state register 3471 contains the field BS=00 indicating that bus 100 is in its IDLE state or if bus state register 3471 contains the field BS=10 indicating that bus 100 is in its KNOWN state and the contents of bus ownership register 3470 indicate that bus 100 is presently owned by a communications controller having a lower priority. In accordance with Example 1, bus state register 3471 contains the field BS=00 indicating that bus 100 is in its IDLE state and, accordingly, transmit control circuit 3301 enters BEGIN state 304. In BEGIN state 304, circuit 3301 transmits signals to multiplexer 3307 via control bus 3302 such that multiplexer 3307 first transmits the PREEMPT character 11111110 and then transmits the FLAG character 01111110 to bus 100. Circuit 3301 also transmits a signal to FCS shift register 3306, and, in response, register 3306 is initialized to have an FCS field of 16 logic one bits. Further, circuit 3301 transmits a signal to transmit shift register 3305, which, in response, reads the address byte from transmit data register 3240 via parallel path 3241. Once the address byte has been conveyed from register 3240 to register 3305, transmit control circuit 3301 writes a logic one Transmit Data Register Empty (TDRE) bit in report register 3230 (FIG. 18) via a path 3231 and enters an ADDRESS state 305 (FIG. 12). In the ADDRESS state 305, circuit 3301 transmits signals via control bus 3302 to transmit shift register 3305 and multiplexer 3307 such that the address byte is serially transmitted from transmit shift register 3305 via a conductor 3351, multiplexer 3307, conductor 3353, sync flip-flop 3308 and inverter 3500 to bus 100. Circuit 3301 also transmits a signal via control bus 3302 to FCS shift register 3306 such that the address byte transmitted by transmit shift register 3305 on conductor 3351 is also shifted into FCS shift register 3306. Circuit 3301 monitors the bit stream transmitted on conductor 3353 via report bus 3303 and maintains an internal status variable defining the number, $N_2$, of consecutive logic one bits transmitted. When the status variable defining $N_2$ indicates that five consecutive logic one bits have been transmitted, circuit 3301 interrupts the shifting of bits in transmit shift register 3305 and FCS shift register 3306 and effects a transmission of a dummy logic zero bit by multiplexer 3307. While in the ADDRESS state 305, circuit 3301 monitors a Transmit First or Intermediate Byte (TFIB) bit in command register 3220 via path 3221.

Recall that transmit control circuit 3301 stored a logic one TDRE bit in report register 3230 indicating that the contents of transmit data register 3240 had been stored in transmit shift register 3305. The TDRE bit is monitored via a path 3209 by an interrupt generator 3290, which, in response to the storing of the logic one TDRE bit, transmits an interrupt signal to processor 3001 via a conductor 3001-I. In response to the interrupt signal, processor 3001 transmits a signal via control bus 3001-CB to formatter interface 3010 resulting in the transmission of the first data byte from formatter interface 3010 via data bus 3001-DB to transmit data register 3240. Processor 3001 then writes a logic one TFIB bit in command register 3220, and in response thereto, transmit control circuit 3301 enters a DATA state 306 (FIG. 12). In the DATA state 306, transmit control circuit 3301 controls the storage by transmit shift register 3305 of the first data byte from transmit data register 3240 and the subsequent transmission of that byte to FCS shift register 3306 and also via multiplexer 3307 to bus 100. Circuit 3301 again writes a logic one TDRE bit in report register 3230 and, in response thereto, interrupt generator 3290 transmits an interrupt signal to processor 3001. Processor 3001 effects a transmission of the second data byte from formatter interface 3010 to transmit data register 3240 and again writes a logic one TFIB bit in command register 3220. In response to the logic one TFIB bit, circuit 3301 remains in the DATA state 306 and controls the transmission of the second data byte into FCS shift register 3306 and also to bus 100. While in the DATA state 306, circuit 3301 monitors the TFIB bit and, in addition a Transmit Last Byte (TLB) bit in command register 3220 (FIG. 17). The process repeats and all intermediate bytes are transmitted from formatter interface 3010 to bus 100. When formatter interface 3010 determines that the last data byte of the frame is available, it signals processor 3001 by transmitting a signal referred to herein as a completion signal, via control bus 3001-CB and after that byte is written in transmit data register 3240, processor 3001 writes a logic one TLB bit in command register 3220. The writing of the logic one TLB bit in transmit data register 3240 is also referred to herein as transmitting an end signal. In response to the logic one TLB bit, circuit 3301 enters an FCS state 307 (FIG. 12) wherein the last data byte is transmitted to bus 100 and the 16-bit contents of FCS shift register 3306 are serially transmitted via multiplexer 3307 to bus 100 immediately thereafter. Circuit 3301 then enters an END FLAG state 308 (FIG. 12), controls the transmission by multiplexer 3307 of one FLAG character 01111110 to bus 100 and then returns to the IDLE state 302, wherein multiplexer 1307 repetitively transmits logic zero bits to bus 100. This completes the transmission of one frame from user device 10-1 (FIG. 15). In each of the other communications controllers 3000-0 and 3000-2 through 3000-15, the transmit control circuit 3301 remains in the IDLE state 302 throughout Example 1. If during the transmission of the frame while circuit 3301 of communications controller 3000-1 was in the BEGIN state 304, the ADDRESS state 305, the DATA state 306, the FCS state 307, or the END FLAG state 308 processor 3001 had determined that the frame should be aborted, it would have written a logic one Transmit Abort Character (TAC) bit in command register 3220 (FIG. 17) and circuit 3301, in response, would have entered an ABORT state 309 (FIG. 12). In the ABORT state 309, circuit 3301 effects the transmission by multiplexer 3307 of the ABORT character 11111111 to bus 100, and reenters the IDLE state 302.

In accordance with the Example 2 (FIG. 16), after the transmission to bus 100 of the opening flag, the address field and at least 16 non-flag bits (excluding dummy zero bits) of the frame from user device 10-1, user device 10-3 begins transmitting data to formatter interface 3010 in communications controller 3000-3. Transmit control circuit 3301 in communications controller 3000-3 is in the IDLE state 302. Upon receiving data from user device 10-3, formatter interface 3010 informs processor 3001 via control bus 3001-CB of its desire to transmit data to user device 10-13 via bus 100. In response, processor 3001 writes a logic one TAB bit into command register 3220 and the address byte 00111101, defining source user device 10-3 and destination user device 10-13, into transmit data register 3240. In response to the TAB bit, transmit control circuit 3301 enters the WAIT state 303 (FIG. 12). In the WAIT state 303, transmit control circuit 3301 reads via report bus 3303 the contents of bus ownership register 3470 and bus state register 3471 in the receiver 3400 of communications controller 3000-3. In accordance with Example 2, bus state register 3471 contains the field BS=10 indicating that bus 100 is in the KNOWN state and bus ownership register 3470 contains the source subfield 0001 indicating that communications controller 3000-1 presently owns bus 100. Transmit control circuit 3301 of communications controller 3000-3 also reads via path 3211 the four-bit field 0011 in ID register 3210 defining user device 10-3. Since user device 10-3 has priority over user device 10-1, transmit control circuit 3301 of communications controller 3000-3 enters the BEGIN state 304. Recall that transmit control circuit 3301 maintains an internal status variable defining the number, $N_5$, of consecutive logic one bits conveyed on bus 100. In the present example, $N_5=3$ and transmit control circuit 3301 of communications controller 3000-3 controls the transmission by multiplexer 3307 of four logic one bits followed by a logic zero bit to complete the PREEMPT character 11111110.

At this time, transmit control circuit 3301 of communications controller 3000-1 is in DATA state 306. When communications controller 3000-3 transmits the first of the four logic one bits, exclusive-OR gate 3700 of communications controller 3000-1 detects a bit difference (BD) between the logic zero transmitted by transmitter 3300 of communications controller 3000-1 and the logic one conveyed on bus 100. Accordingly exclusive-OR gate 3700 transmits a logic one signal via a D-type sync flip-flop 3309 and report bus 3303 to transmit control circuit 3301. Flip-flop 3309 stores bits at its output terminal on a negative edge of the clock signal transmitted by clock generator 54 via AND gate 3310. In response to the Logic one signal, transmit control circuit 3301 enters a HOLD state 310 (FIG. 12). Recall that circuit 3301 maintains internal status variables defining, $N_1$, $N_2$, and $N_5$ and an internal status variable X defining the previous FIG. 12 state. In this instance, X defines DATA state 306. When transmit control circuit 3301 enters HOLD state 310 it transmits via path 3330 the values of the variables defining $N_1$, $N_2$, and $N_5$ and the variable X to state register 3304 to be saved therein. Transmit control circuit also transmits a logic zero signal via control bus 3302 to AND gate 3310, thereby disabling the distribution within transmitter 3300 of the clock signal from clock generator 54. Accordingly, the contents of registers 3240, 3304, 3305 and 3306, which contents are referred to as the first set of status variables, are saved in those registers. In HOLD state 310, transmit control circuit 3301 monitors via report bus 3303 the bus ownership register 3470 and the bus state register 3471 to determine when communications controller 3000-1 regains bus ownership (RBO).

Recall that after entering the BEGIN state 304, transmit control circuit 3301 of communications controller 3000-3 had controlled the transmission by multiplexer 3307 to complete the PREEMPT character 11111110. Transmit control circuit 3301 then controls the transmission by multiplexer 3307 of the FLAG character 01111110. The transmission of the PREEMPT character followed by the FLAG character is referred to herein as transmitting a start preemption signal. In accordance with Example 2, transmit control circuit 3301 of communications controller 3000-3 then enters ADDRESS state 305, DATA state 306, FCS state 307 and END FLAG state 308 and returns to IDLE state 302 as the complete preempting frame is transmitted by communications controller 3000-3 without interruption.

When the preempting frame closing flag, also referred to herein as an end preemption signal, is received by the receiver 3400 in communications controller 3000-1, and the source subfield 0001 and the field BS=10 are again stored, as described later herein, in bus ownership register 3470 and bus state register 3471, communications controller 3000-1 regains bus ownership (RBO). Transmit control circuit 3301 of communications controller 3000-1 reads via path 3331 the state register 3304 to return the status variables defining $N_1$, $N_2$ and $N_5$ to the values they had at the time of interruption and the status variable X to define DATA state 306. Based on the variable X, circuit 3301 returns to DATA state 306. Note that if transmit control circuit 3301 had been interrupted while in the FCS state 307 or the END FLAG state 308, transmit control circuit 3301 would have returned to the FCS state 307 or the END FLAG state 308, respectively. However, if circuit 3301 had been interrupted while in the ADDRESS state 305, it would have returned to the BEGIN state 304. After circuit 3301 returns to the DATA state 306 it uses the value of the status variable $N_5$ and controls the transmission by multiplexer 3307 of $N_5-1$ consecutive logic ones followed by a logic zero to replace the bits transmitted while the PREEMPT character 11111110 was being conveyed on bus 100. In Example 2, the saved value of $N_5$ in communications controller 3000-1 was $N_5=4$ since four consecutive logic ones had been conveyed on bus 100 when communications controller 3000-1 was interrupted. Then transmit control circuit 3301 transmits a logic one signal via control bus 3302 to AND gate 3310 and the distribution within transmitter 3300 of the clock signal from clock generator 54 is resumed. As the balance of the preempted frame is transmitted by communications controller 3000-1 without interruption, transmit control circuit 3301 enters FCS state 307, END FLAG state 308 and returns to IDLE state 302.

Reception of Information from Bus 100

The reception of information from bus 100 will now be described in greater detail with reference to Example 1 (FIG. 15) and Example 2 (FIG. 16). Each communications controller receiver 3400 operates continuously to monitor the transmission on bus 100. Their operation differs only with respect to the transfer of data to the associated user device in that data is transferred to only the destination user device defined by the received destination subfield.

Figures 13, 14:
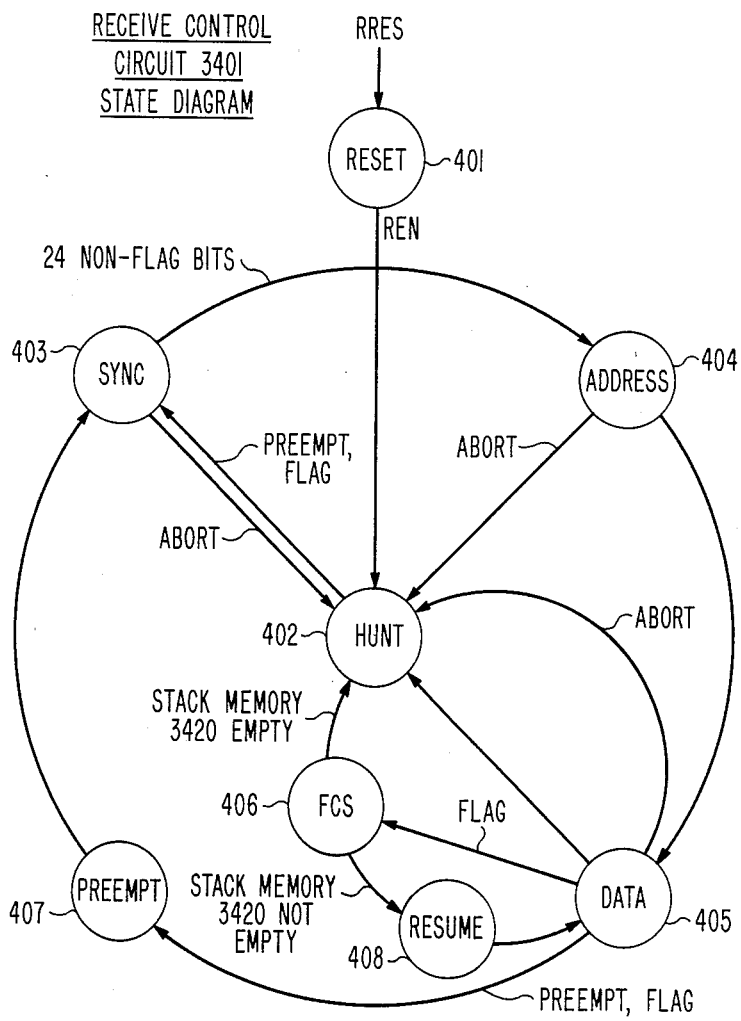

In each communications controller 3000-0 through 3000-15, operation is initiated when processor 3001 resets receiver 3400 by writing a logic one Receiver Reset (RRES) bit in command register 3220 (FIG. 17) of processor interface 3200 and receive control circuit 3401, upon detecting such RRES bit via path 3221, enters a RESET state 401 (FIG. 13). In the RESET state 401, receive control circuit 3401 monitors a Receiver Enable (REN) bit in command register 3220 via path 3221. When processor 3001 writes a logic one REN bit in command register 3220 to enable receiver 3400, receive control circuit 3401 detects such REN bit and enters a HUNT state 402 (FIG. 13). Each bit received on bus 100 is transmitted via inverter 3600, a D-type sync flip-flop 3405 and a conductor 3451 to an eight-bit control shift register 3406. Sync flip-flop 3405 assures that bus 100 is sampled at the appropriate time. Flip-flop 3405 stores bits at its output terminal connected to conductor 3451 on the negative edge of the clock signal transmitted by clock generator 54. Character detector 3407 monitors the contents of control shift register 3406 for the presence of the FLAG character 01111110, the ABORT character 11111111 or the PREEMPT character 11111110 and when such character is detected so informs receive control circuit 3401 via report bus 3403. Character detector 3407 also informs receive control circuit 3401 via report bus 3403 when seven consecutive logic ones are received by control shift register 3406. When, in accordance with Example 1 (FIG. 1), the seven logic ones of the PREEMPT character 11111110 are received and receive control circuit 3401 is so informed, circuit 3401 writes via control bus 3402 the field BS=11 into bus state register 3471 indicating that the present bus 100 state is the UNKNOWN state. When first the PREEMPT character 11111110 and then the opening flag are detected in control shift register 3406 by character detector 3407, receive control circuit 3401 enters a SYNC state 403 (FIG. 13). Report register 3230 (FIG. 18) includes three bits comprising a Receiver State Field (RSF) used to inform processor 3001 of events within receiver 3400. When receive control circuit 3401 enters the SYNC state 403, it stores the field RSF=000 in report register 3230 indicating that an opening flag has been detected (FIG. 14). Subsequent bits received from bus 100 are shifted first into control shift register 3406, then into 16-bit FCS holding register 3409 via a conductor 3452 and then into eight-bit receive shift register 3410 via a conductor 3453. Bits transmitted by control shift register 3406 are also shifted into 16-bit FCS shift register 3408 which, after being initialized to have an FCS field of 16 logic one bits, sequentially generates the above-described FCS field. Recall that the bits comprising the PREEMPT, ABORT or FLAG characters are not shifted into register 3408, 3409 and 3410. Receive control circuit 3401 monitors the bit stream transmitted by control shift register 3406 and maintains an internal status variable defining the number, $N_4$, of consecutive logic one bits transmitted by control shift register 3406. When the internal status variable defining $N_4$ indicates that five consecutive logic one bits have been transmitted by control shift register 3406, receive control circuit 3401 controls registers 3408, 3409 and 3410 via control bus 3402 such that the next bit transmitted by control shift register 3406, which should be an inserted dummy zero bit, is not shifted into those registers 3408, 3409 and 3410. When 24 bits (excluding dummy zero bits) have been received from bus 100 after the opening flag, receive control circuit 3401 determines based on the bit count that receive shift register 3410 contains the address field of the frame (FIG. 15) and receive control circuit 3401 thereafter enters an ADDRESS state 404 (FIG. 13). In the ADDRESS state 404, receive control circuit 3401 effects a transfer of the contents of receive shift register 3410 in parallel via path 3251 to receive data register 3250 and also in parallel via path 3468 to bus ownership register 3470. Receive control circuit 3401 writes via control bus 3402 the field BS=11 in bus state register 3471 indicating that the present bus 100 state is the KNOWN state and writes the field RSF=001 and a logic one Receive Data Register (RDRF) bit into report register 3230 indicating that an address byte is available in receive data register 3250. Note that in Example 1 (FIG. 15) the destination subfield is 1100 defining user device 10-12. In communications controller 3000-12 only, receive control circuit 3401, based upon the equality of the destination subfield 1100 in bus ownership register 3470 and the field 1100 in ID register 3210, writes a logic one DD bit in report register 3230 (FIG. 18). The DD and RDRF bits are monitored via path 3209 by an interrupt generator 3290, which in response to the logic one DD bit and the logic one RDRF bit, transmits an interrupt signal to processor 3001 via a conductor 3001-I. Processor 3001 reads the RSF field in report register 3230 via data bus 3001-DB, and in response thereto reads the address byte from receive data register 3250 via data bus 3001-DB. Processor 3001 interprets the address byte and is informed thereby that data bytes subsequently received in receive data register 3250 are to be conveyed via data bus 3001-DB to formatter interface 3010 and in turn to destination user device 10-12. In each of the communications controllers, receive control circuit 3401 now enters a DATA state 405 (FIG. 13). In the DATA state 405, subsequently received bits from bus 100 continue to be shifted into the register 3406, 3408, 3409 and 3410. Receive control circuit 3401 maintains a second internal status variable defining the number, $N_3$, of bits shifted into receive shift register 3410 since the last byte was transferred from receive shift register 3410 to receive data register 3250. When such variable indicates that eight bits have been shifted into receive shift register 3410, receive control circuit 3401 effects a transfer of the contents of receive shift register 3410 in parallel via path 3251 to receive data register 3250 and writes the field RSF=010 (FIG. 14) and a logic one RDRF bit into report register 3230, indicating that a data byte is available in receive data register 3250. Only in communications controller 3000-12 does the processor 3001 respond to such report register 3230 information by controlling the transmission of the data byte in receive data register 3250 to formatter interface 3010. This process repeats and subsequent data bits received from bus 100 are conveyed in eight-bit bytes to receive data register 3250 until character detector 3407 informs receive control circuit 3401 via report bus 3403 of the presence of a FLAG character 01111110, an ABORT character 11111111 or a PREEMPT character 11111110 in control shift register 3406. In accordance with Example 1 (FIG. 15), the next such character to be received from bus 100 is the closing flag of the frame. Upon the detection of the closing flag, receive control circuit 3401 enters an FCS state 406 (FIG. 13). In the FCS state 406, receive control circuit 3401 effects a transfer of the contents of receive shift register 3410, which contents comprise the last byte of the frame data field, to receive data register 3250. FCS holding register 3409 contains the frame FCS field at this time. The frame FCS field has also been shifted into FCS shift register 3408. The operation of FCS shift register 3408 is such that after the entire frame, excluding the PREEMPT character and opening flag but including the FCS field, has been shifted in, the generated 16-bit FCS field should equal a constant field if none of the bits received from bus 100 were in error. FCS shift register 3408, to be described in more detail later herein, compares the generated FCS field with the constant field and informs receive control circuit 3401 of the result via report bus 3403. Receive control circuit 3401 then writes either the field RSF=011 (FIG. 14) indicating that the frame was completed without error or the field RSF=111 indicating that the frame was completed with error in report register 3230 via path 3231. Only in communications controller 3000-12 does the processor 3001 inform formatter interface 3010 upon detecting such an RSF field. In each communications controller, the receive control circuit 3401 then returns to HUNT state 402 and writes via control bus 3402 the field BS=00 into bus state register 3471 indicating that the present bus 100 state is IDLE. In accordance with Example 1, no subsequent frame is immediately forthcoming and consecutive logic zero bits are received from bus 100. This completes the reception of the frame of FIG. 15. If at any time while receive control circuit 3401 was in the SYNC state 403, the ADDRESS state 404 or the DATA state 405, character detector 3407 had detected the ABORT character 11111111, receive control circuit 3401 would have returned to the HUNT state 402.

In accordance with Example 2 (FIG. 16), after the PREEMPT character 11111110, the opening flag, the address field and at least 16 non-flag bits of the frame from user device 10-1 have been received from bus 100 by the receiver 3400 of each communications controller 3000-0 through 3000-15, the PREEMPT character 11111110 is received. At this time, the receive control circuit 3401 of each communications controller 3000-0 through 3000-15 is in the DATA state 405. When character detector 3407 detects the seven logic ones of the PREEMPT character 11111110 in control shift register 3406, it so informs receive control circuit 3401 via report bus 3403. In response, receive control circuit 3401 writes via control bus 3402 the field BS=11 into bus state register 3471 indicating that the present bus 100 state is the UNKNOWN state. When character detector 3407 detects first the completed PREEMPT character 11111110 and then the opening flag, it so informs receive control circuit 3401 via report bus 3403 and, in response, receive control circuit 3401 enters a PREEMPT state 407 (FIG. 13) and transmits the present values of its internal status variables defining N3 and N4 to state register 3404 via path 3430 for storage therein. The receive control circuit 3401 of each communications controller 3000-0 through 3000-15 then effects a transmission of the contents of registers 3470, 3471, 3404, 3410, 3409 and 3408, which contents comprise the present values of the second set of status variables via paths 3467, 3469, 3414, 3413, 3412 and 3411, respectively, and multiplexer/demultiplexer 3421, to stack memory 3420 to be saved in predefined locations therein. Receive control circuit 3401 writes the field RSF=110 (FIG. 14) in report register 3230 indicating the detection of the graceful preemption. Receive control circuit 3401 then effects a reinitialization of FCS shift register 3408 to an FCS field of 16 logic one bits and returns to the SYNC state 403. As the complete preempting frame (FIG. 16) is received from bus 100 without interruption, the receive control circuit 3401 in each of the communications controllers 3000-0 through 3000-15 enters the ADDRESS state 404, the DATA state 405 and the FCS state 406 in the above-described manner. Since the destination subfield 1101 of the preempting frame defines user device 10-13, only in communications controller 3000-13 will the DD bit be set to logic one in report register 3230 and will data be conveyed via formatter interface 3010. In each communications controller 3000-0 through 3000-15, stack control circuit 3422 stores a bit defining whether stack memory 3420 is empty. After FCS shift register 3408 informs receive control circuit 3401 via report bus 3403 whether the preempting frame was received with or without errors, receive control circuit 3401 reads the stored stack control circuit 3422 bit, which in accordance with Example 2, indicates that stack memory 3420 is not empty. In response, receive control circuit 3401 enters a RESUME state 408 (FIG. 13). In the RESUME state 408, receive control circuit 3401 effects a transmission of the values of the second set of status variables, which values are saved in stack memory 3420, via multiplexer/demultiplexer 3421 and paths 3467, 3469, 3414, 3413, 3412 and 3411 to registers 3470, 3471, 3404, 3410, 3409 and 3408, respectively. In accordance with Example 2, the address field 00011100 is transmitted to bus ownership register 3470 and the field BS=10 is transmitted to bus state register 3471. In response to the contents of registers 3470 and 3471, communications controller 3000-1 regains bus ownership and resumes transmission of the preempted frame, communications controller 3000-13 stops transferring data to user device 10-13 and communications controller 3000-12 resumes the transfer of data to user device 10-12. In each communications controller, the receive control circuit 3401 reads the contents of state register 3404 via path 3431 to return its two internal status variables to their values at the point of graceful preemption. Receive control circuit 3401 then allows the first eight bits following the preempting frame closing flag to be shifted into control shift register 3406 and returns to the DATA state 405 and the balance of the preempted frame is received in the above-described manner.

Figure 8:
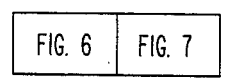
Figure 7:
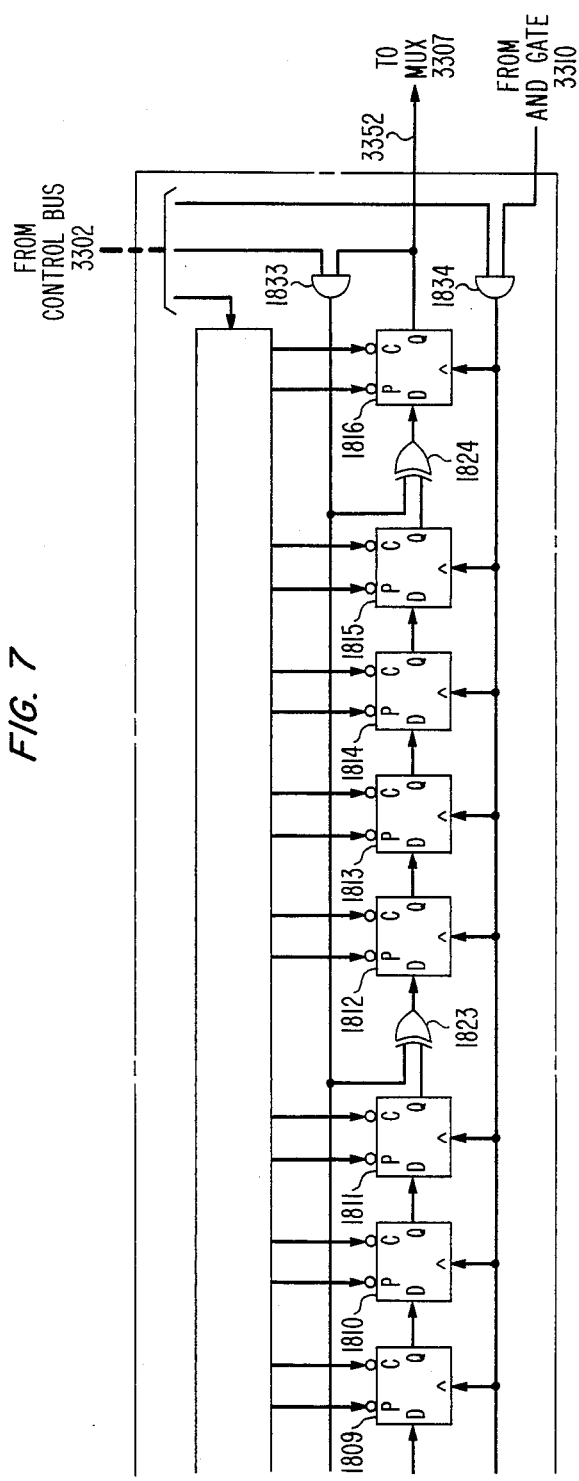

An exemplary embodiment of FCS shift register 3306, shown in FIG. 6 and 7 arranged in accordance with FIG. 8, includes 16 D-type flip-flops 1801 through 1816 arranged as a shift register. Each of the flip-flops 1801 through 1816 has a preset input terminal P and a clear input terminal C, which terminals are used to initialize the flip-flops to predetermined values. Transmitting a logic zero signal and a logic one signal to the P and C terminals, respectively, of a given flip-flop results in a logic one signal being present at the Q output terminal of that flip-flop. Similarly, transmitting a logic one signal and a logic zero signal to the P and C terminals, respectively, results in a logic zero being present at the Q output terminal. Transmitting logic one signals to both the P and C terminals results in the logic signal at the D input terminal being stored at the Q output terminal. Transmit control circuit 3301 (FIG. 3) initializes FCS shift register 3306 by transmitting a signal via control bus 3302 to an FCS load register 1831, which, in response, transmits logic zero signals to the 16 flip-flop 1801 through 1816 P terminals and logic one signals to the C terminals. Accordingly, each of the flip-flops 1801 through 1816 is initialized to have a logic one signal at its Q output terminal.

FCS shift register 3306 operates in two modes—a generate mode where it sequentially generates a 16-bit FCS field from bits transmitted by transmit shift register 3305 (FIG. 3) on conductor 3351 and a shift mode where the contents of the flip-flops 1801 through 1816 are sequentially transmitted to multiplexer 3307 (FIG. 3) on conductor 3352. Transmit control circuit 3301 transmits a logic one signal to a first input terminal of an AND gate 1833 to place FCS shift register 3306 in the generate mode. Since the Q terminal of flip-flop 1816 is connected to the second input terminal of AND gate 1833, when FCS shift register 3306 is in the generate mode the logic signal transmitted at the flip-flop 1816 Q terminal is fed back via AND gate 1833 to an input terminal of each of four exclusive-OR gates 1821 through 1824. Gates 1821 through 1824 are respectively interposed between transmit shift register 3305 and flip-flop 1801, between flip-flop 1804 and flip-flop 1805, between flip-flop 1811 and flip-flop 1812 and between flip-flop 1815 and flip-flop 1816 to generate the particular frame check sequence of the present exemplary embodiment. Transmit control circuit 3301 effects the clocking of flip-flops 1801 through 1816 by transmitting a logic one signal to a first input terminal of an AND gate 1834, whereupon the clock signal transmitted by clock generator 54 via AND gate 3310 to the second input terminal of AND gate 1834 is thereafter applied to the flip-flops 1801 through 1816. Accordingly, in the generate mode for any given bit received from transmit shift register 3305 on conductor 3351, the signals at the Q terminals of the flip-flops 1801 through 1816 comprise the 16-bit FCS field at that time. When transmit control circuit 3301 transmits a logic zero signal to the first input terminal of AND gate 1833, FCS shift register 3306 operates in the shift mode wherein AND gate 1833 transmits a logic zero signal to each of the exclusive-OR gates 1821 through 1824 and the contents of flip-flops 1801 through 1816 are sequentially transmitted to multiplexer 3307 on conductor 3352.

Figure 11:
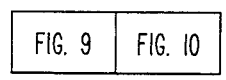
Figure 10:
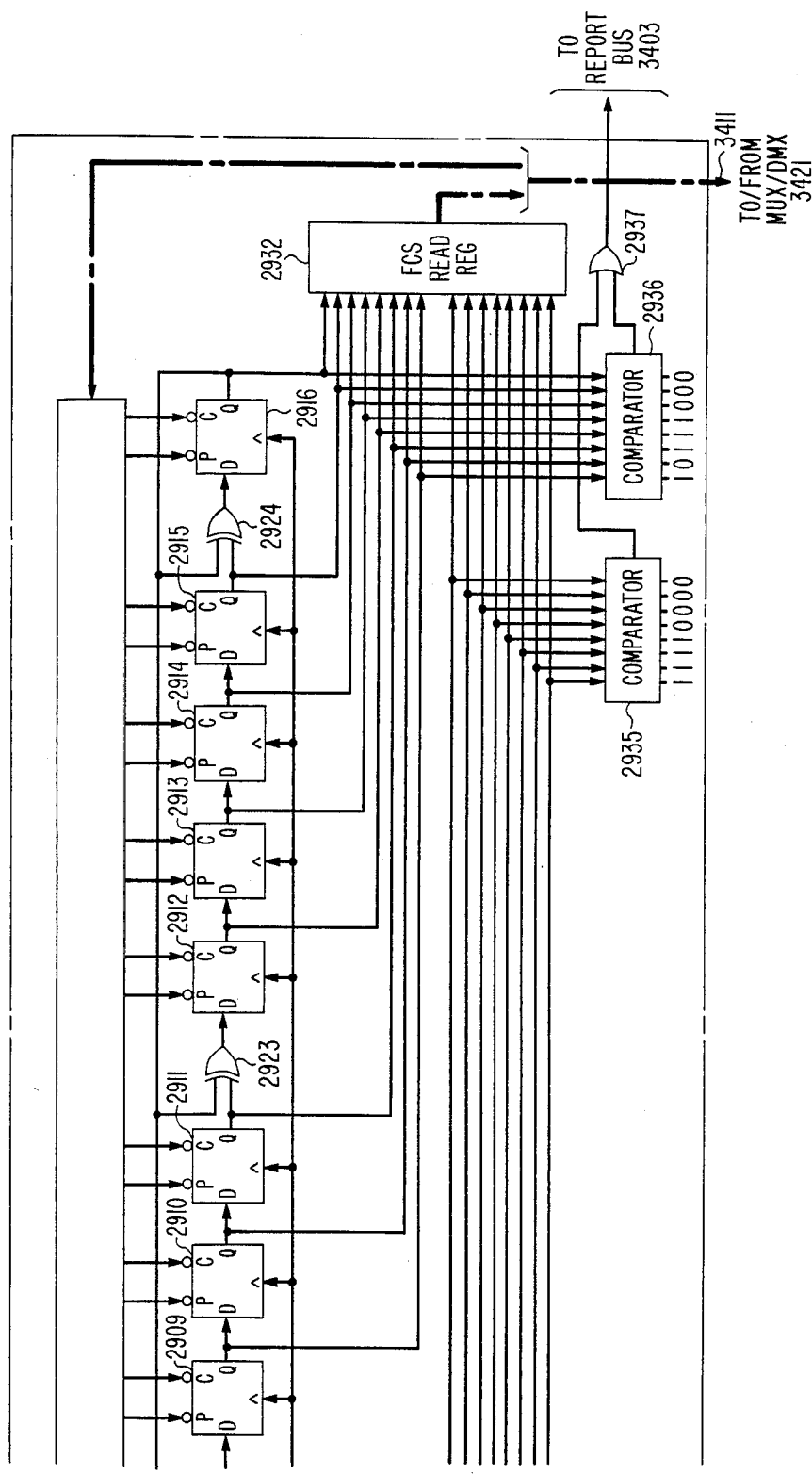

FCS shift register 3408, which is shown in FIG. 9 and 10 arranged in accordance with FIG. 11, includes 16 D-type flip-flops 2901 through 2916, four exclusive-OR gates 2921 through 2924 and an AND gate 2934 which generate the FCS field in the same manner as flip-flops 1801 through 1816, exclusive-OR gates 1821 through 1824 and AND gate 1834 of FCS shift register 3306. FCS shift register 3408 includes an FCS load register 2931 which operates under the control of receive control circuit 3401 (FIG. 4) to initialize flip-flops 2901 through 2916. The signals transmitted by each of the flip-flops 2901 through 2916 Q output terminals are stored in an FCS read register 2932. When receive control circuit 3401 determines that a graceful preemption has occurred, the contents of FCS read register 2932 are transmitted to stack memory 3420 via multiplexer/demultiplexer 3421 for storage therein. Receive control circuit 3401 transmits a signal to FCS load register 2931 to reinitialize each of the flip-flops 2901 through 2916 to have a logic one signal at the Q terminal. After the closing flag of the preempting frame is transmitted, receive control circuit 3401 effects a transmission of the stored 16-bit FCS field from stack memory 3420 to FCS load register 2931, which, in response, transmits the appropriate signals to the flip-flop P and C terminals such that the signals at the Q terminals are exactly the same as they were at the point of graceful preemption.

FCS shift register 3408 operates only in the generate mode since it is not required to sequentially transmit its FCS field and accordingly the equivalent of AND gate 1833 is not included in FCS shift register 3408. The frame check sequence of the present embodiment is such that after the FCS field of a given frame is shifted into FCS shift register 3408, the generated FCS field should be a predetermined constant field if no errors were received. Therefore the signals at the Q output terminals of the flip-flops 2901 through 2916 are compared with predetermined constant fields by two eight-bit comparators 2935 and 2936. When either of the comparators 2935 or 2936 detects a difference between the signal at a flip-flop Q terminal and the predetermined constant, it transmits a logic one signal to an OR gate 2937 which in turn transmits a logic one signal via report bus 3403 informing receive control circuit 3401 of the detected error.

EXAMPLE 3

Figure 19:
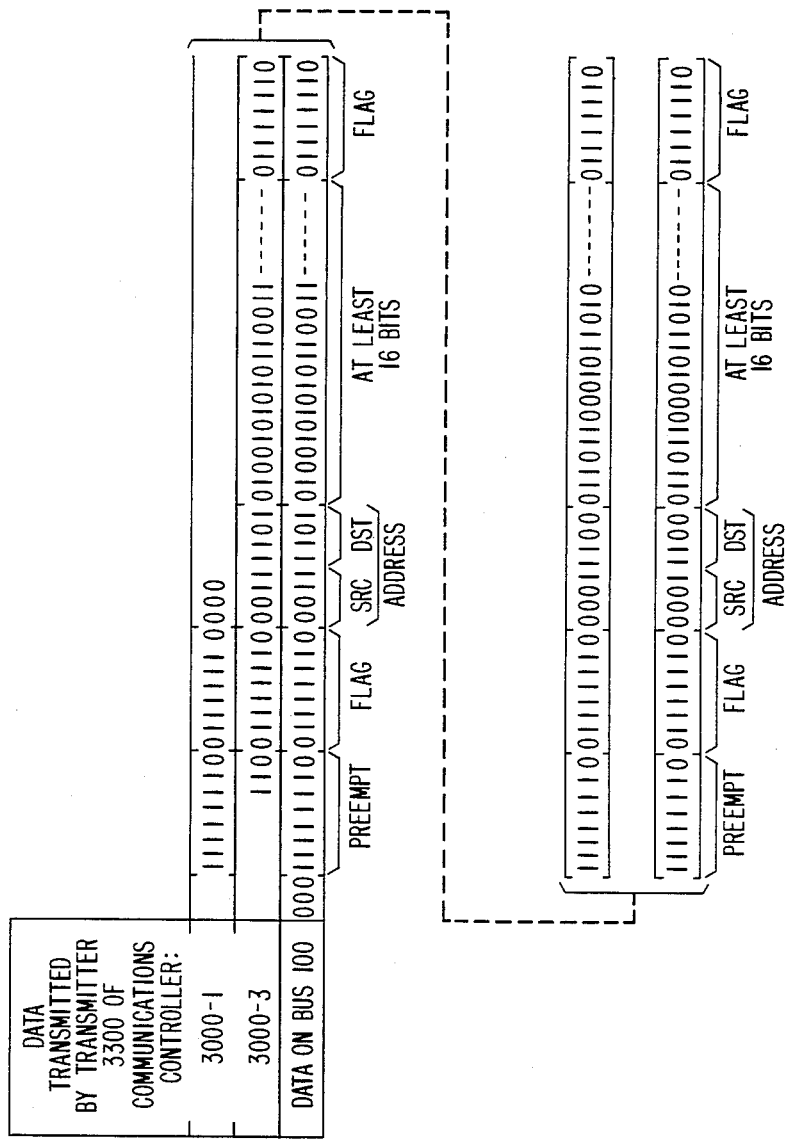

The advantageous operation of the system of FIG. 1 is further illustrated by an example wherein two communications controllers attempt to obtain access to a previously idle bus 100 at nearly the same time (Example 3, FIG. 19). In accordance with Example 3, communications controller 3000-1 begins transmitting the PREEMPT character 11111110. After five consecutive logic ones have been conveyed on bus 100, communications controller 3000-3 decides to obtain access to bus 100 and since bus 100 is still in the IDLE state and since five consecutive logic ones have been conveyed, communications controller 3000-3 transmits two logic ones and then a logic zero to complete the PREEMPT character 11111110. Note that if communications controller 3000-1 had transmitted seven consecutive logic ones before communications controller 3000-3 decided to obtain bus 100 access, bus 100 would be in the UNKNOWN state and communications controller 3000-3 would be unable to obtain access. Continuing with Example 3, both communication controllers 3000-1 and 3000-3 transmit the FLAG character 01111110 in synchronism and then begin transmitting their respective source subfields 0001 and 0011, respectively. However, when communications controller 3000-1 transmits the third logic zero bit of its source subfield 0001, it detects a bit difference and terminates transmission. Communications controller 3000-3 transmits its entire frame without interruption. When communications controller 3000-1 detects the frame closing flag on bus 100, it reinitiates the transmission of its frame from the beginning.

EXAMPLE 4

Figure 20:
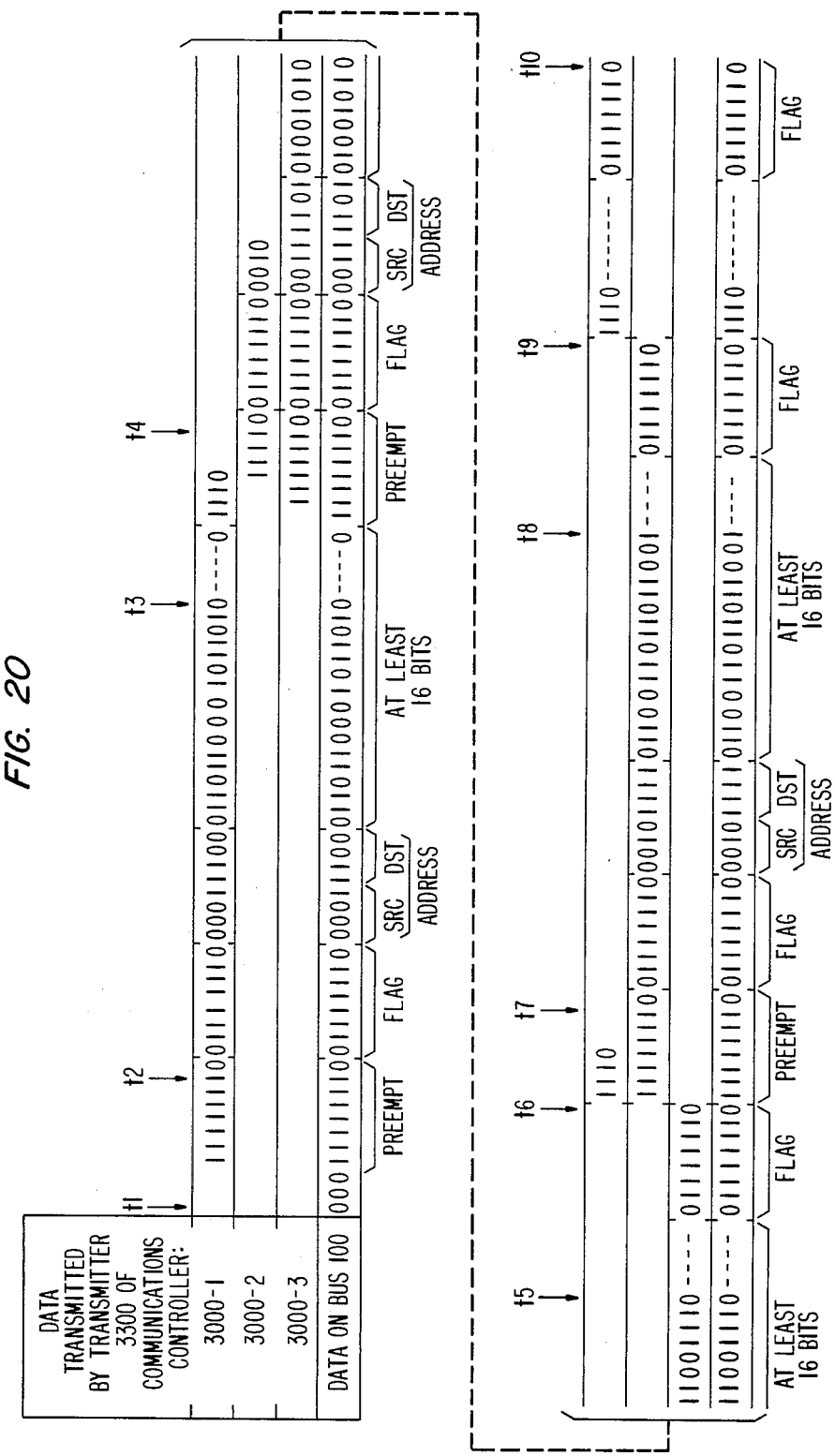

The operation of the system of FIG. 1 is further illustrated by Example 4 (FIG. 20). In FIG. 20, ten significant events are denoted by the symbols t1 through t10. The state and ownership of bus 100 at the time of those events are given in FIG. 21. In accordance with Example 4, communications controller 3000-1 begins transmitting a frame to previously idle (FIG. 21, time t1) bus 100. When communications controller 3000-1 has transmitted seven consecutive logic one bits, bus 100 is defined to be in the UNKNOWN state (FIG. 21, time t2). After communications controller 3000-1 has transmitted the PREEMPT character 11111110, the FLAG character 01111110, the address field and 16 non-flag bits (excluding dummy zero bits), the bus 100 state is the KNOWN state and bus 100 is owned by communications controller 3000-1 (FIG. 21, time t3). At a time when communications controller 3000-1 has just transmitted a logic zero and then a single logic one, communications controller 3000-3, knowing it has priority over the present bus 100 owner, decides to obtain bus 100 access and transmits six consecutive logic ones followed by a logic zero to complete the PREEMPT character 11111110. Communications controller 3000-1 terminates its transmission upon detecting a bit difference but saves its first set of status variables so that is can properly resume the frame without retransmitting it in its entirety. However, after communications controller 3000-3 has transmitted only two of the six consecutive logic ones, communications controller 3000-2, completely unaware of the access attempt by communications controller 3000-3 but knowing it has priority over the present bus 100 owner, decides to obtain bus 100 access. At that point, three consecutive logic ones of the PREEMPT character 11111110 have been conveyed on bus 100 so communications controller 3000-2 transmits four consecutive logic ones followed by a logic zero to complete the PREEMPT character. At time t4, when seven consecutive logic ones have been conveyed on bus 100, bus 100 is again in the UNKNOWN state and preemptions by other communications controllers are not allowed. Communications controllers 3000-2 and 3000-3 transmit the FLAG character 01111110 in synchronism and then begin transmitting their source subfields 0010 and 0011, respectively. When communications controller 3000-2 detects a bit difference, it terminates transmission. Since communications controller 3000-2 was interrupted when its transmit control circuit 3301 was in the ADDRESS state 305 (FIG. 12), communications controller 3000-2 will retransmit its entire frame when it next attempts to obtain bus 100 access. After communications controller 3000-3 has completed the transmission of the address field and 16 non-flag bits (excluding dummy zero bits), bus 100 is again in the KNOWN state but now bus 100 is owned by communications controller 3000-3 (FIG. 21, time t5).

In accordance with Example 4, communications controller 3000-3 completes the transmission of its frame without interruption. After the frame closing flag has been conveyed on bus 100, communications controller 3000-1 regains bus ownership (FIG. 21, time t6). Based on the saved status variable which indicates that four consecutive logic ones had been conveyed on bus 100 at the time that communications controller 3000-1 was previously interrupted, communications controller 3000-1 transmits three consecutive logic ones followed by a logic zero to replace the bits that were being transmitted while the PREEMPT character 11111110 was being conveyed. However, also at time t6, communications controller 3000-2, knowing it has priority over bus 100 owner communications controller 3000-1, transmits the entire PREEMPT character to obtain bus 100 access. Communications controller 3000-1 again terminates transmission upon detecting a bit difference. In accordance with Example 4, the entire frame from communications controller 3000-2 is transmitted without interruption. Once the frame closing flag is conveyed on bus 100, communications controller 3000-1 regains bus ownership and transmits the balance of its frame without further interruption. Note that first communications controller 3000-3, then communications controller 3000-2, and finally communications controller 3000-1 complete transmission in accordance with the predefined priority criteria.

It is to be understood that the above-described embodiment is merely illustrative of the principles of the invention and that other embodiments may be devised by those skilled in the art without departing from the spirit and scope of the invention. For example, although only certain variables were included in the first and second sets of status variables defined herein, it is to be understood that as the functions performed within the communications controllers become increasingly complex, additional variables may be included in those sets. Further, the above-described frame check sequence is only illustrative and other error checking methods can be used rather than the particular method described herein.

What is claimed is:

1. A system for communicating among a plurality of user devices via a bus, said system comprising a plurality of communications controllers each comprising transmitter means for selectively coupling at least one of said plurality of user devices to said bus to transmit information in frames, each frame including a priority field and receiver means comprising means for monitoring said bus and means for storing priority fields conveyed on said bus and wherein the transmitter means of a first communications controller further comprises means responsive to a request signal from a first user device and to a priority field of a first frame presently being conveyed on said bus, said priority field of said first frame being stored by the receiver means of said first communications controller, for coupling said first user device to said bus to preemptively transmit, before the completion of said first frame, a second frame having a higher priority than the priority indicated by said priority field stored by said receiver means of said first communications controller.

2. A system in accordance with claim 1 wherein said transmitter means of said first communications controller further comprises means responsive to said request signal and to said priority field stored by said receiver means of said first communications controller for repetitively transmitting a predetermined logic value to said bus before said first user device is coupled to said bus.

3. A system in accordance with claim 2 wherein each of said plurality of communications controllers further comprises detector means for generating a difference signal when a difference is detected between a logic value transmitted by the transmitter means of that communications controller and a logic value conveyed by said bus and wherein the transmitter means of a second communications controller coupling a second user device to said bus further comprises means responsive to said difference signal generated by the detector means of said second communications controller for decoupling said second user device from said bus.

4. A system in accordance with claim 3 wherein the receiver means of each of said plurality of communications controllers is associated with a second set of status variables collectively defining the present status of that receiver means and wherein said transmitter means of said first communications controller further comprises means responsive to said request signal and to said priority field stored by said receiver means of said first communications controller for transmitting a start peemption signal to said bus before said first user device is coupled to said bus by said coupling means of said first communications controller to transmit said higher priority frame and wherein the receiver means of each of said plurality of communications controllers further comprises means responsive to said start preemption signal for saving values of the associated second set of status variables.

5. A system in accordance with claim 4
wherein said transmitter means of said first communications controller further comprises means for transmitting an end preemption signal to said bus and wherein the receiver means of each of said plurality of communications controllers further comprises means responsive to said end preemption signal for returning that receiver means to the status defined by the saved values of the second set of status variables associated with that receiver means.

6. A system in accordance with claim 5 wherein said transmitter means of said second communications controller is associated with a first set of status variables collectively defining the present status of said transmitter means of said second communications controller and wherein said transmitter means of said second communications controller further comprises means responsive to said difference signal generated by said detector means of said second communications controller for saving values of said first set of status variables.

7. A system in accordance with claim 6 wherein said transmitter means of said second communications controller further comprises means responsive to a receipt by the receiver means of said second communications controller from said bus of said end preemption signal for returning said transmitter means of said second communications controller to the status defined by said saved values of said first set of status variables.

8. A system in accordance with claim 1 wherein said transmitter means of said first communications controller further comprises means for counting the number, $N_5$, of consecutive bits conveyed on said bus having a predetermined logic value and means responsive to said request signal and to said priority field stored by said receiver means of said first communications controller for consecutively transmitting said predetermined logic value a number, $N_6$, of times such that the sum of $N_5$ and $N_6$ is a fixed number and then transmitting a bit sequence including a priority field before said first user device is coupled to said bus by said coupling means of said first communications controller to transmit said higher priority frame.

9. A system in accordance with claim 8 wherein each of said plurality of communications controllers further comprises detector means for generating a difference signal when a difference is detected between a logic value transmitted by the transmitter means of that communications controller and a logic value conveyed by said bus and wherein the transmitter means of a second communications controller coupling a second user device to said bus further comprises means responsive to said difference signal generated by the detector means of said second communications controller for decoupling said second user device from said bus.

10. A system in accordance with claim 1 wherein the receiver means of said each of said plurality of communications controllers further comprises means for selectively coupling said at least one of said plurality of user devices to said bus to receive information from said bus.

11. In a digital communications system wherein first and second communications controllers transmit information in frames on a shared bus, a method comprising initiating transmission, by said first communications controller, of a first frame including a priority field, monitoring, by each of said first and second communications controllers, said shared bus to detect priority fields conveyed on said bus, storing, by said second communications controller, said priority field transmitted by said first communications controller and detected on said bus by said second communications controller, making a determination, by said second communications controller, based on said stored priority field and a second priority field of a second frame to be transmitted by said second communications controller, that said second frame is of higher priority than said first frame and preemptively transmitting, by said second communications controller upon said determination, said second frame before the transmission of said first frame is completed by said first communications controller.

12. A method in accordance with claim 11 wherein the characteristics of said shared bus are such that when said second communications controller transmits a first predetermined logic value, said shared bus conveys said first predetermined logic value regardless of a logic value transmitted by said first communications controller, said method further comprising repetitively transmitting, by said second communications controller, upon said determination, said first predetermined logic value, detecting, by said first communications controller, a difference between a logic value transmitted by said first communications controller and a logic value conveyed by said shared bus and terminating transmission, by said first communications controller, upon detecting said difference detected in said detecting step.

13. A method in accordance with claim 12 further comprising saving, by said first communications controller after terminating transmission, a status variable representing the number, $N_5$, of consecutive bits conveyed on said bus having said first predetermined logic value.

14. A method in accordance with claim 13 further comprising after said second frame is transmitted by said second communications controller, transmitting, by said first communications controller, based on said saved status variable representing said number, $N_5$, said first predetermined logic value $N_5-1$ times and then transmitting a second predetermined logic value.

15. A method for determining priority between first and second communications controllers in obtaining access to a shared bus by synchronously transmitting priority fields, the characteristics of said shared bus being such that when either one of said first and second communications controllers transmits a predetermined logic value, said shared bus conveys said predetermined logic value regardless of a logic value transmitted by the other one of said first and second communications controllers, said method comprising monitoring, by each of said first and second communications controllers, said shared bus to determine the number of times said predetermined logic value is consecutively conveyed on said bus for use in completing transmission of an initial bit sequence of a character, said initial bit sequency comprising a fixed number of consecutive bits of said predetermined logic value, said fixed number being a positive integer greater than one, transmitting, in order to complete transmission of said initial bit sequence of said character by said first communications controller when said first communications controller is attempting to obtain access to said bus, said predetermined logic value a number of times such that said predetermined logic vlaue is consecutively conveyed said fixed number of times on said shared bus including any times that said predetermined logic value was consecutively conveyed on said bus as determined by said first communications controller immediately prior to attempting to obtain access, and then transmitting a first predetermined sequence of logic values including a first priority field, transmitting, in order to complete transmission of said initial bit sequence of said character by said second communications controller when said second communications controller is attempting to obtain access to said shared bus, said predetermined logic value a number of times such that said predetermined logic value is consecutively conveyed said fixed number of times on said shared bus including any times that said predetermined logic value was consecutively conveyed on said bus as determined by said second communications controller immediately prior to attempting to obtain access, and then transmitting a second predetermined sequence of logic values including a second priority field, where said second priority field is transmitted in synchronism with the transmission of said first priority field by said first communications controller, detecting, by said first communications controller during the synchronous transmission of said first and second priority fields, a difference between a logic value transmitted by said first communications controller and a logic value conveyed on said shared bus and terminating transmission, by said first communications controller, upon detecting said difference detected in said detecting step.

16. A method for determining priority among a plurality of communications controllers in obtaining access to a shared bus by synchronously transmitting priority fields, the characteristics of said shared bus being such that when any of said plurality of communications controllers transmits a predetermined logic value, said shared bus conveys said predetermined logic value regardless of the logic values transmitted by the others of said plurality of communications controllers, said method comprising monitoring, by each of said plurality of communications controllers, said shared bus to determine the number of times said predetermined logic value is consecutively conveyed on said bus for use in completing transmission of an initial bit sequence of a character, said initial bit sequence comprising a fixed number of consecutive bits of said predetermined logic value, said fixed number being a positive integer greater than one, transmitting, in order to complete transmission of said initial bit sequence of said character by each of said plurality of communications controllers when that communications controller is attempting to obtain access to said bus, said predetermined logic value a number of times such that said predetermined logic value is consecutively conveyed said fixed number of times on said shared bus including any times that said predetermined logic value was consecutively conveyed on said bus as determined by that communications controller immediately prior to attempting to obtain access, and then transmitting a predetermined sequence of logic values including a priority field associated with that communications controller, where the priority fields transmitted by said plurality of communications controllers are transmitted in synchronism, detecting, by ones of said plurality of communications controllers during the synchronous transmission of said priority fields transmitted by said plurality of communications controllers, a difference between a logic value transmitted by that communications controller and a logic value conveyed on said shared bus and terminating transmission, by said one of said plurality of communications controllers, upon detecting in said detecting step said difference.

* * * * *